US012647475B2

(12) United States Patent
Mcphee et al.

(10) Patent No.: US 12,647,475 B2
(45) Date of Patent: \*Jun. 2, 2026

(54) DYNAMIC GENERATION AND PROVISIONING OF DIGITAL CONTENT TO NETWORK-CONNECTED DEVICES

(71) Applicant: The Toronto-Dominion Bank, Toronto (CA)

(72) Inventors: Adam Douglas Mcphee, Waterloo (CA); Matta Wakim, Petersburg (CA); Kyryll Odobetskiy, Waterloo (CA); John Jong-Suk Lee, Toronto (CA); Arun Victor Jagga, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/941,877

(22) Filed: Sep. 9, 2022

(65) Prior Publication Data

US 2023/0007075 A1 Jan. 5, 2023

Related U.S. Application Data

(63) Continuation of application No. 15/874,978, filed on Jan. 19, 2018, now Pat. No. 11,477,265.

(51) Int. Cl.
*H04L 67/10* (2022.01)
*G06N 20/00* (2019.01)
(Continued)

(52) U.S. Cl.
CPC .............. *H04L 67/10* (2013.01); *G06N 20/00* (2019.01); *H04L 67/52* (2022.05); *H04L 67/53* (2022.05); *G06Q 30/0277* (2013.01)

(58) Field of Classification Search
CPC ......... H04L 67/10; H04L 67/52; H04L 67/53; G06N 20/00; G06Q 30/0277
See application file for complete search history.

(56) References Cited

U.S. PATENT DOCUMENTS 6,965,868 B1 11/2005 Bednarek
8,812,526 B2 8/2014 Ramer et al.
(Continued)

OTHER PUBLICATIONS

Dhar et al., "Challenges and business models for mobile location-based services and advertising," Communications of the ACM 54.5, 2011, pp. 121-128.
(Continued)

*Primary Examiner* — Glenton B Burgess
(74) *Attorney, Agent, or Firm* — NIXON PEABODY LLP

(57) ABSTRACT

The disclosed exemplary embodiments include computer-implemented systems, apparatuses, and processes that automatically and dynamically generate and provision digital content to network-connected devices operating within a computing environment. For example, an apparatus may receive information generated by an application program executed by a communications device and based on the generated information, obtain an identifier of a third party associated with the executed application program. The apparatus may further identify and obtain first elements of digital content that include a representation of the identifier, and generate a second element of digital content that incorporates a subset of the first elements of digital content. The apparatus may also transmit the second element of digital content through a programmatic interface to the communications device, which may display the second element of digital content on an interface.

19 Claims, 13 Drawing Sheets

(51) Int. Cl.

| | |
|---|---|
| *G06Q 30/0241* | (2023.01) |
| *H04L 67/52* | (2022.01) |
| *H04L 67/53* | (2022.01) |

(56) References Cited

U.S. PATENT DOCUMENTS

| | | | |
|---|---|---|---|
| 9,117,238 B2 | 8/2015 | Tapley et al. | |
| 9,390,139 B1 * | 7/2016 | Bhattacharjee | G06Q 30/0277 |
| 9,436,956 B2 | 9/2016 | Jaramillo | |
| 9,466,073 B2 * | 10/2016 | Reis | G06Q 30/0254 |
| 9,609,577 B1 | 3/2017 | Ramalingam | |
| 9,665,874 B2 | 5/2017 | Chau et al. | |
| 9,785,974 B1 * | 10/2017 | Periasamy | G06Q 30/0267 |
| 10,296,938 B1 * | 5/2019 | Demsey | G06Q 30/0277 |
| 11,030,659 B1 * | 6/2021 | Lewis | G06Q 30/0277 |
| 2002/0026353 A1 | 2/2002 | Porat et al. | |
| 2002/0107027 A1 | 8/2002 | O'Neil et al. | |
| 2003/0084449 A1 * | 5/2003 | Chane | H04N 21/2665 |
| | | | 348/E5.006 |
| 2011/0035458 A1 | 2/2011 | Burnim | |
| 2011/0208589 A1 | 8/2011 | Gard | |
| 2011/0264530 A1 * | 10/2011 | Santangelo | H04L 67/53 |
| | | | 370/352 |
| 2012/0191514 A1 | 7/2012 | Roper et al. | |
| 2012/0197787 A1 | 8/2012 | Grigg | |
| 2013/0085860 A1 * | 4/2013 | Summers et al. | |
| 2013/0097009 A1 * | 4/2013 | Akadiri | G06Q 30/0269 |
| | | | 705/14.41 |
| 2015/0026289 A1 * | 1/2015 | Nordness | H04L 67/1097 |
| | | | 709/213 |
| 2015/0149542 A1 | 5/2015 | Jain et al. | |
| 2015/0227972 A1 | 8/2015 | Tang | |
| 2015/0248410 A1 | 9/2015 | Stickler et al. | |
| 2015/0348097 A1 | 12/2015 | Andrianakou et al. | |
| 2015/0373084 A1 | 12/2015 | Krochmal et al. | |
| 2016/0071122 A1 | 3/2016 | Chau et al. | |
| 2016/0086212 A1 | 3/2016 | Tietzen et al. | |
| 2016/0117722 A1 * | 4/2016 | Garcia | G06Q 30/0251 |
| | | | 705/14.49 |
| 2017/0091822 A1 * | 3/2017 | Tian | G06F 18/22 |
| 2017/0187837 A1 * | 6/2017 | Ao | H04L 67/53 |
| 2017/0270582 A1 * | 9/2017 | Forss | G06F 16/9538 |
| 2019/0075339 A1 * | 3/2019 | Smith | H04N 21/25883 |
| 2019/0080494 A1 | 3/2019 | Timonen et al. | |
| 2019/0114661 A1 * | 4/2019 | Bennion | G06Q 30/0277 |

OTHER PUBLICATIONS

Li et al., "Building a targeted mobile advertising system for location-based services," Decision Support Systems, vol. 54, Issue 1, 2012, pp. 1-8.

\* cited by examiner

DYNAMIC GENERATION AND PROVISIONING OF DIGITAL CONTENT TO NETWORK-CONNECTED DEVICES

CROSS-REFERENCE TO RELATED APPLICATION

This application is a continuation of, and claims the benefit of priority to, U.S. application Ser. No. 15/874,978, filed Jan. 19, 2018, the disclosure of which is incorporated by reference herein to its entirety.

TECHNICAL FIELD

The disclosed embodiments generally relate to computer-implemented systems and processes that dynamically generate and provision digital content to network-connected devices.

BACKGROUND

Today, many digital platforms enable network-connected systems and devices to access, generate, and distribute digital content that, among other things, is relevant to one or more merchants operating within a geographic region, or to one or more products or services offered for sale by these merchants. An intersection between these digital platforms, and many conventional content provisioning systems, is often characterized by inefficient and computationally expensive manual intervention and implementation.

SUMMARY

In one example, an apparatus includes a communications unit, a storage unit storing instructions, and at least one processor coupled to the communications unit and the storage unit. The at least processor may be configured to execute the instructions to receive a first signal via the communications unit. The received signal may include information generated by an application program executed by a communications device, and based on the generated information, the at least one processor may be further configured to obtain an identifier of a third party associated with the executed application program. The at least one processor may be further configured to identify and obtain first elements of digital content that include a representation of the identifier, generate a second element of digital content that incorporates a subset of the first elements of digital content, and transmit a second signal via the communications unit to the communications device. The second signal may be transmitted through a programmatic interface associated with the executed application program, the second signal may include the second element of digital content, and the communications device may be configured by the executed application program to display the second element of digital content on an interface.

In another example, a computer-implemented method includes receiving, by at least one processor, a first signal including information generated by an application program. The application program may be executed by a communications device, and based on the generated information, the computer-implemented method may obtain an identifier of a third party associated with the executed application program. The method also includes identifying and obtaining, by the at least one processor, first elements of digital content that include a representation of the identifier, generating, by the at least one processor, a second element of digital content that incorporates a subset of the first elements of digital content, and transmitting, by the at least one processor, a second signal that includes the second element of digital content to the communications device. The second signal may be transmitted through a programmatic interface associated with the executed application program, and the communications device may be configured by the executed application program to display the second element of digital content on an interface.

Further, in some examples, a tangible, non-transitory computer-readable medium storing instructions that, when executed by at least one processor, perform a method that includes receiving a first signal including information generated by an application program. The application program may be executed by a communications device, and based on the generated information, the method may obtain an identifier of a third party associated with the executed application program. The method also includes identifying and obtaining first elements of digital content that include a representation of the identifier, generating a second element of digital content that incorporates a subset of the first elements of digital content, and transmitting a second signal that includes the second element of digital content to the communications device. The second signal may be transmitted through a programmatic interface associated with the executed application program, and the communications device may be configured by the executed application program to display the second element of digital content on an interface.

It is to be understood that both the foregoing general description and the following detailed description are exemplary and explanatory only and are not restrictive of the invention, as claimed. Further, the accompanying drawings, which are incorporated in and constitute a part of this specification, illustrate aspects of the present disclosure and together with the description, serve to explain principles of the disclosed embodiments as set forth in the accompanying claims.

DETAILED DESCRIPTION

Figure 1:
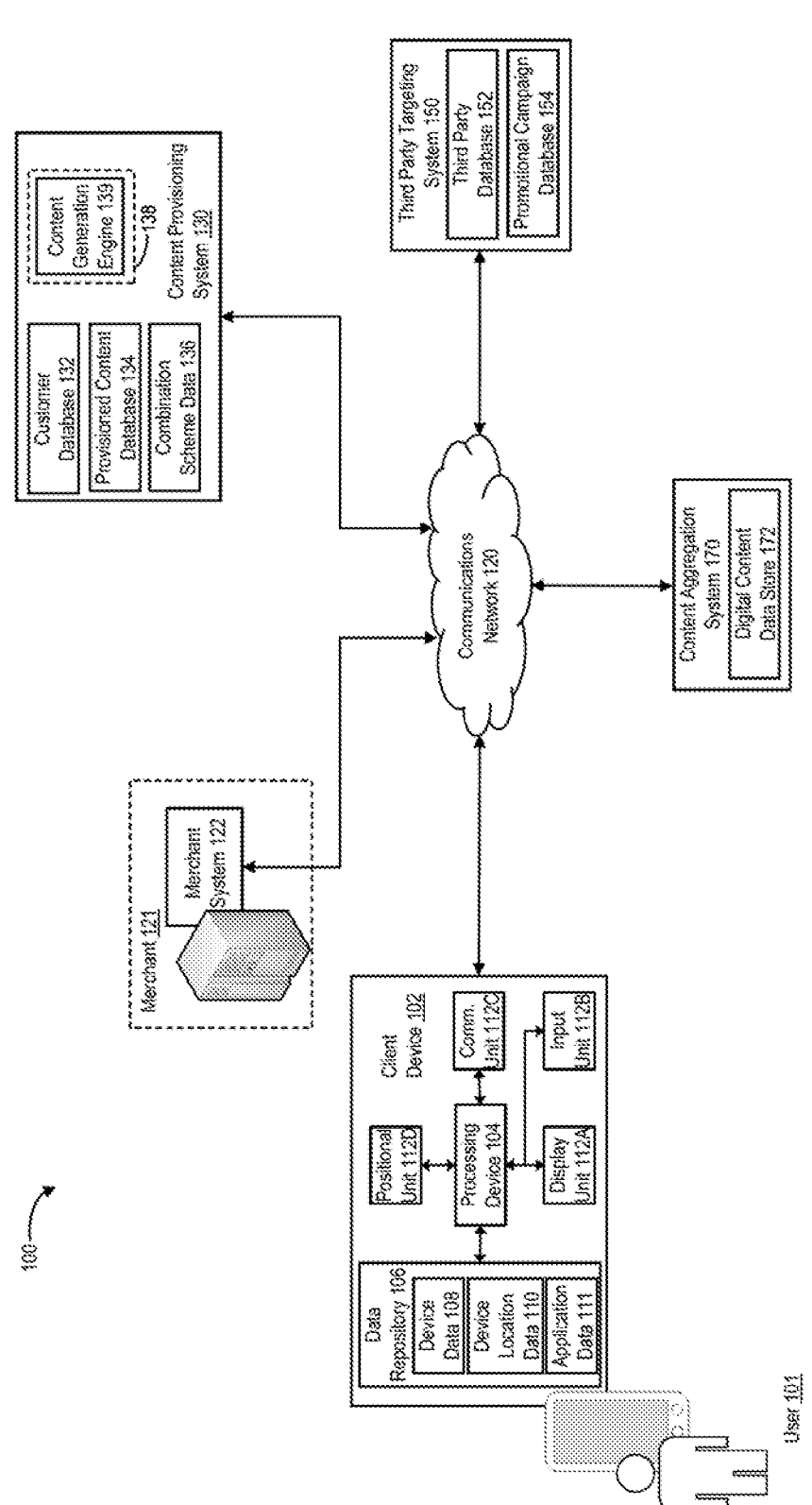
FIG. 1 is a diagram of an exemplary computing environment, consistent with disclosed embodiments.

Reference will now be made in detail to the disclosed embodiments, examples of which are illustrated in the accompanying drawings. The same reference numbers in the drawings and this disclosure are intended to refer to the same or like elements, components, and/or parts.

In this application, the use of the singular includes the plural unless specifically stated otherwise. In this application, the use of "or" means "and/or" unless stated otherwise. Furthermore, the use of the term "including," as well as other forms such as "includes" and "included," is not limiting. In addition, terms such as "element" or "component" encompass both elements and components comprising one unit, and elements and components that comprise more than one subunit, unless specifically stated otherwise. Additionally, the section headings used herein are for organizational purposes only, and are not to be construed as limiting the described subject matter.

This specification describes exemplary computer-implemented systems, devices, and processes that, among other things, automatically and dynamically generate and provision digital content to network-connected devices operating within a computing environment. By way of example, as described herein, a computing system operating within the computing environment (e.g., a "content provisioning system") may receive a first signal that includes information generated by an application program executed at a network-connected device (e.g., a "client device") operating within the computing environment). The information may include a unique identifier of executed application program, and in some instances, may also include a current geographic location of the client device (e.g., as determined by an embedded positioning unit), a unique identifier of a user that operates the client device (e.g., an authentication credential associated with the application program or assigned by the content provisioning system) or a unique identifier of the client device (e.g., an Internet Protocol (IP) address or a media access control (MAC) address).

In some embodiments, the receipt of the first signal and the information included therein, may cause the content provisioning system to perform any of the exemplary processes described herein, either alone or in conjunction with other network-connected computing system operating within environment 100, that dynamically and selectively combine elements of digital content associated with the executed application program, and that automatically provision the combined elements of digital content to the client device in real-time and without intervention from a corresponding user. For example, and based on the generated information, the content provisioning system may identify and load, from a locally or remotely accessible storage unit, an identifier of a third-party approved to distribute content to the executed application program (e.g., an "approved" third party). The third-party identifier may, in some instances, be identified based on the unique identifier of the executed application program, either alone or in conjunction with location data specifying a current or prior geographic location of the client device (e.g., as incorporated within the generated information), preference data specifying one or more content-delivery preferences of a user that operates the client device, or targeting data established by the third party.

The content provisioning system may perform further operations to identify and obtain elements of digital content (e.g., "first" elements of digital content) that include or reference the third-party identifier. In some examples, the content provisioning system may obtain the first elements of digital content that one or more network-connected computing systems that aggregate and maintain digital content generated by users of one or more digital platforms (e.g., a "content aggregation" system). For instance, the content aggregation system may subscribe to, and receive data streams generated by, one or more social media or microblogging platforms, and additionally or alternatively, may be configured to execute one or more application programs that scrape published digital content from corresponding web pages (e.g., via a corresponding programmatic interface, such as an application programming interface (API)).

Further, in some instances, the content provisioning system may generate a second element of digital content that includes a selectively combined subset of the first elements of digital content, e.g., which include or reference the third-party identifier. As described herein, the content provisioning system may select the subset of the first elements of digital content for inclusion within the second element of digital content, and/or may combine the selected subset of the first digital content elements to form the second digital content element, based on an application of one or more adaptive or dynamic combination schemes, algorithms, or processes to information, such as metadata, that characterizes the each of the first digital content elements.

By way of example, the one or more applied adaptive or dynamic combination schemes may, when applied to the information characterizing the first digital content elements, establish an ordering or a position of the each of the subset of the first digital content elements within the newly generated second digital content element, and additionally or alternatively, a visual format of the each of the subset of the first digital content elements within the newly generated second digital content element. Examples of the adaptive or dynamic combination schemes may include, but are not limited to, a weighted combination scheme (e.g., those based on an impact or sentiment analysis), a hierarchical combination scheme, or a combination scheme based on one or more machine learning algorithms, clustering algorithms, or collaborative filtering algorithms.

The content provisioning system may generate a second signal that includes the newly generated second element of digital content, and perform operations that transmit the generated second signal across the communications network to the client device, e.g., through a corresponding programmatic interface established or maintained by the executed application program. The client device may, for example, be configured to preset the second element of digital content, which includes the dynamically and adaptively combined subset of the first elements of digital content, within a portion of an interface, such as a graphical user interface generated by the executed application program.

In some examples, and as described herein, the approved third party may correspond to a merchant, and the third-party identifier may correspond to any merchant- or product-specific identifier that facilitates the identification of the first elements of digital content, e.g., by the content aggregation system. Examples of the merchant- or product-specific identifiers include, among other things, merchant- or product-specific hashtags (e.g., that characterize content within one or more social media or microblogging platforms, such as Facebook™, Instagram™, or Twitter™), merchant names or merchant acronyms, locational identifiers, merchant nicknames, or other information capable of uniquely identifying digital content associated with the merchant or products offered for sale by that merchant.

Additionally, the first elements of digital content may be generated by users that operate network-connected devices within the computing environment and interact with the one or more digital platforms described herein (e.g., "user-generated" digital content within accessible web pages, user- or location-based social media platforms, microblogging platforms, etc.). The user-generated digital content may include digital images, digital video, digital audio, and/or combinations thereof, and examples of the user-generated digital may include, but are not limited to, images of the merchant or of one of more products or services offered for sale by the merchant, user-generated reviews or commentary on the merchant, or user-generated reviews or commentary on the one or more products or services.

Further, the second element of digital content, which includes a selectively combined subset of the user-generated content, may correspond to a dynamically generated advertisement for the merchant or for the one or more products or services, which the content provisioning system can automatically provision to the client device based on the information included within the received first signal, e.g., the current geographic location of the client device. Additionally, and as described herein, the second element of digital content may also include additional content of relevance to the merchant or to the one or more products or services, such as digital advertisements or promotions that offer a predetermined percentage or monetary discount of purchases initiated at the merchant or involving the one or more products or services.

Certain of the exemplary, computer-implemented processes described herein dynamically select elements of digital content referencing an identifier of a third-party based on location, preference, or target data, adaptively combine the selected digital content elements into a single, aggregated digital content element, and automatically provision the aggregated digital content element to a client device without intervention. Further, certain of these exemplary, computer-implemented processes may also be implemented in addition to, or as an alternate to, conventional processes that provisional static and predetermined elements of digital content to client devices operated by certain classes or groups of customers.

By dynamically selecting the digital content elements in accordance with customer-specific location or preference data, or with merchant-specific targeting data, certain of these exemplary processes may increase a relevance of the generated and provisioned digital content elements to a user operating the client device, and this reduce a number of digital content elements that, when provisioned to the client device, achieve a desired impact on the user. The reduction in the number of generated and/or provisioned digital content elements can, in some instances, increase an operational efficiency of the content provisioning system and reduce a volume of data exchanged between the content provisioning system and other network-connected systems and devices operating within the computing environment, thus increasing an amount of available bandwidth and reducing a likelihood of malicious activity, such as man-in-the-middle attacks.

I. Exemplary Computing Environments

FIG. 1 is a diagram illustrating an exemplary computing environment 100, consistent with certain disclosed embodiments. As illustrated in FIG. 1, environment 100 may include one or more devices, such as client device 102, a merchant system 122, a content provisioning system 130, a content targeting system 150, and a content aggregation system 170, each of which may be interconnected through any appropriate combination of communications networks, such as network 120. Examples of network 120 include, but are not limited to, a wireless local area network (LAN), e.g., a "Wi-Fi" network, a network utilizing radio-frequency (RF) communication protocols, a Near Field Communication (NFC) network, a wireless Metropolitan Area Network (MAN) connecting multiple wireless LANs, and a wide area network (WAN), e.g., the Internet.

In an embodiment, client device 102 may include a computing device having one or more tangible, non-transitory memories that store data and/or software instructions, and one or more processors, e.g., processor 104, configured to execute the software instructions. The one or more tangible, non-transitory memories may, in some aspects, store software applications, application modules, and other elements of code executable by the one or more processors, such as a web browser, an application associated with content provisioning system 130 (e.g., a mobile application), and additionally or alternatively, a payment application associated with a payment service (e.g., a mobile application that establishes and maintains a mobile wallet).

Client device 102 may also establish and maintain, within the one or more tangible, non-tangible memories, one or more structured or unstructured data repositories or databases, e.g., data repository 106, that include device data 108, device location data 110, and application data 111. In one instance, device data 108 may include data that uniquely identifies client device 102, such as a media access control (MAC) address of client device 102 or an IP address assigned to client device 102, and device location data 110 such as geographic location information that identifies geographic locations of client device 102 at corresponding times and dates (e.g., a latitude, longitude, or altitude measured by an on-board positioning unit at regular temporal intervals).

Referring back to FIG. 1, client device 102 may also include a display unit 112A configured to present interface elements to user 101, and an input unit 112B configured to receive input from user 101, e.g., in response to the interface elements presented through display unit 112A. By way of example, display unit 112A may include, but is not limited to, an LCD display unit or other appropriate type of display unit, and input unit 112B may include, but is not limited to, a keypad, keyboard, touchscreen, voice activated control technologies, or appropriate type of input unit. Further, in additional aspects (not depicted in FIG. 1), the functionalities of display unit 112A and input unit 112B may be combined into a single device, e.g., a pressure-sensitive touchscreen display unit that presents interface elements and receives input from user 101. Client device 102 may also include a communications unit 112C, such as a wireless transceiver device, coupled to processor 104 and configured by processor 104 to establish and maintain communications with network 120 using any of the communications protocols described herein.

Additionally, in some aspects, client device 102 may include a positioning unit 112D, such as, but not limited to, an on-board Global Positioning System (GPS) receiver, an on-board assisted GPS (A-GPS) receiver, or a positioning unit consistent with other positioning systems. Positioning unit 112D may be configured by processor 104 to determine a geographic location of client device 102 (e.g., a longitude, latitude, altitude, etc.) at regular temporal intervals, and to store data indicative of the determined geographic location within a portion of corresponding tangible, non-transitory memory (e.g., device location data 110), along with data identifying the temporal interval (e.g., a time stamp specifying a corresponding time and/or date).

Examples of client device 102 may include, but are not limited to, a personal computer, a laptop computer, a tablet computer, a notebook computer, a hand-held computer, a personal digital assistant, a portable navigation device, a mobile phone, a smart phone, a wearable computing device (e.g., a smart watch, a wearable activity monitor, wearable smart jewelry, and glasses and other optical devices that include optical head-mounted displays (OHMDs)), an embedded computing device (e.g., in communication with a smart textile or electronic fabric), and any other type of computing device that may be configured to store data and software instructions, execute software instructions to perform operations, and/or display information on an interface module, consistent with disclosed embodiments. In some instances, user 101 may operate client device 102 and may do so to cause client device 102 to perform one or more operations consistent with the disclosed embodiments.

Referring back to FIG. 1, merchant system 122, content provisioning system 130, third-party targeting system 150, and content aggregation system 170 may each represent a computing system that includes one or more servers (not depicted in FIG. 1) and tangible, non-transitory memory devices storing executable code and application modules. Further, the servers may each include one or more processor-based computing devices, which may be configured to execute portions of the stored code or application modules to perform operations consistent with the disclosed embodiments, including operations consistent with the exemplary processes described herein, which may automatically generate or modify digital content in accordance with input data, and which may deliver the portions of the customized digital content to client device 102.

In other instances, and consistent with the disclosed embodiments, one or more of merchant system 122, content provisioning system 130, third-party targeting system 150, and content aggregation system 170 may correspond to a distributed system that includes computing components distributed across one or more networks, such as network 120, or other networks, such as those provided or maintained by cloud-service providers. Additionally, in some instances, one or more of merchant system 122, content provisioning system 130, third-party targeting system 150, or content aggregation system 170, can be incorporated into a single computing system, or incorporated into multiple computing systems.

In some examples, merchant system 122 may be associated with, or operated by, a physical or electronic merchant, such as merchant 121 of FIG. 1, and user 101 may correspond to a customer that purchases products or services offered for sale by merchant 121. For instance, merchant system 122 may be associated with a point-of-sale (POS) terminal, such as a network-connected POS terminal device disposed at a physical location of merchant 121 or a digital or virtual POS established by one or more application programs executed by merchant system 122, and the POS terminal may exchange data with client device 102 (e.g., across network 120 or across a direct communications channel (not depicted in FIG. 1) that facilitates an initiation of a transaction to purchase one or more of the products or services offered for sale.

Additionally, and upon execution of stored software instructions, merchant system 122 may also perform operations that provide, to third-party targeting system 150, data confirming an election by merchant 121 to participate in the exemplary content generation and provisioning processes described herein (e.g., data that confirms a status of merchant 121 as a participating merchant). The provided data may, for example, include information that uniquely identifies merchant system 122 (e.g., an assigned IP address or an associated MAC address), one or more unique identifiers of merchant 121 or products or services offered for sale by merchant 121 (e.g., merchant- or product-specific hashtags that characterize content within one or more social media or microblogging platforms, merchant names, nicknames, or acronyms, product names, etc.) along with information identifying one or more geographic locations associated with merchant 121 (or electronic locations, specified by a corresponding web address).

The provided data may also include targeting data that characterizes one or more potential customers of merchant 121 (e.g., "targeted" customers), such as, but not limited to, demographic data characterizing the targeted customers (e.g., ages, genders, interests, physical characteristics, educational or professional background, etc.) or geographic data characterizing the customers (e.g., a home or business address, etc.). Further, in some instances, the provided data may also include promotional data that characterizes one or more promotional campaigns involving merchant 121 or the products or services offered for sale by merchant 121. As described herein, third-party targeting system 150 may associate the provided data with merchant system 122 or merchant 121, and perform operations that store the associated data within one or more tangible, non-transitory memories.

Content provisioning system 130 may, upon execution of stored software instructions, perform operations that identify and obtain elements of digital content (e.g., "first" digital content elements) associated with one or more merchants, such as merchant 121, and that generate an additional element of digital content (e.g., a "second" digital content element) based on a dynamically selected and ordered combination of a subset of the first digital content elements. As described herein, content provisioning system 130 may automatically provision the second digital content element to one or more network-connected devices operating within environment 100, such as client device 102, which may present the second digital content element on a corresponding interface generated by an executed application program, such as a mobile application associated with content provisioning system 130.

In some instances, users of one or more digital platforms may generate portions of the first digital content elements (e.g., based on input provided to corresponding network-connected devices, such as client device 102). Examples of these digital platforms include, but are not limited to, user- and location-based social media platforms (such as Facebook™, Instagram™, Yelp™, TripAdvisor™), micro-blogging platforms (such as Twitter™), and other digital content providers (such as Google Maps™) that publish user-generated digital content relevant to the one or more merchants.

Further, and as described herein, the user-generated digital content may include, but is not limited to, digital images or videos of the merchants or of products or services offered for sale by the participating merchants, digital content that includes user-generated reviews of the merchants or the products or services, or digital content that specifies user-generated comments on the merchants or the products or services. The disclosed embodiments are, however, not limited to these examples of user-generated content or digital platforms, and in other examples, content provisioning system 130 may identify and obtain any additional or alternate type of user-generated content related to the merchants and published by any additional or alternate digital platform operating and accessible within environment 100.

To facilitate the performance of these exemplary content generation and provisioning processes, content provisioning system 130 may maintain, within one or more tangible, non-transitory memories, a customer database 132, a provisioned content database 134, and combination scheme data 136. By way of example, customer database 132 may include structured or unstructured data records that identify and characterize one or more customers, such as user 101, that participate in the exemplary digital content generation and provisioning processes described herein (e.g., "participating" customers). By way of example, and for user 101, the structured or unstructured data records of customer database 132 may include a unique customer identifier of user 101 (e.g., an authentication credential assigned to user 101 by content provisioning system 130), device data that specifies a unique network identifier of a device operated by user 101 (e.g., an IP address, MAC address, or other unique network identifier), and/or a unique identifier associated with an application program executed by client device 102 (e.g., an identifier or address of a programmatic interface (such as an API) established by an executed application program provided or maintained by content provisioning system 130).

The structured and unstructured data records of customer database 132 may also include profile data that identifies and characterizes each of the participating customers, and further, that specifies one or more content-delivery preferences for each of the participating customers. For example, the profile data associated with user 101 may include, among other things, information that identifies user 101 (e.g., a legal name or nickname of user 101, a home address of user 101, an employer or work address of user 101, etc.) and specifies one or more demographic characteristics of user 101 (e.g., an age, gender, a height or weight, interests or hobbies (e.g., international travel, wines, etc.), an educational or professional background, etc.). The profile data associated with user 101 may also specify one or more content-delivery preferences of user 101, such as, but not limited to, a preference to receive digital content related to particular merchants (e.g., merchant 121) or particular products or services (e.g., yoga classes), a preference to receive a particular type of digital content (e.g., video content, etc.), or a preference to receive, or not to receive, digital content derived from a particular source (e.g., a preference to receive content from Twitter™, etc.). The disclosed embodiments are, however, not limited to these examples of profile data, and in other examples, customer database 182 may include any additional or alternate profile data that identifies or characterizes user 101 or other participating customers.

Customer database 132 may also include, within the structured or unstructured data records, customer interaction data that identifies and characterizes an interaction of each of the participating customers with one or more of the digital platforms described herein. For example, the customer interaction data may specify, for user 101, a login or handle assigned to user 101 by the one or more digital platforms (e.g., a Facebook™ identifier or a Twitter™ handle of user 101), data identifying other users linked to user 101 within the one or more digital platforms (e.g., logins or handles assigned to each of the other users, one or more network graphs characterizing the social network inking user 101 to the other users, etc.), and data characterizing the activity of user 101 within the one or more digital platforms (e.g., data characterizing a temporal evolution of postings, viewed content, or other activities of user 101 within the digital platforms, etc.). The disclosed embodiments are, however, not limited to these examples of customer interaction data, and in other examples, customer database 182 may include any additional or alternate data that identifies or characterizes the interaction of user 101 and other participating customers within any of the digital platforms described herein.

Referring back to FIG. 1, provisioned content database 134 may include structured or unstructured data records that identify and characterize elements of digital content previously generated and provisioned to client device 102 and/or other network-connected devices operating within environment 100, e.g., by content provisioning system 130 using any of the exemplary processes described herein. For example, and for a particular element of provisioned digital content, the structured or unstructured data records of provisioned content database 134 may specify information that includes, but is not limited to: an identifier of a network-connected device that received the provisioned digital content element (e.g., an IP address or MAC address of client device 102); an identifier of one or more merchants associated with provisioned digital content element (e.g., a merchant name, a merchant classification code (MCC), etc.); or identifiers of one or more discrete digital content elements selectively combined to generate the provisioned digital content element (e.g., sources of the discrete digital content elements, etc.).

Further, in some examples, the structured or unstructured records of provisioned content database 134 may also identify elements of promotional data included within one or more of the provisioned digital content elements. As described herein, the promotional data may characterize one or more promotional campaigns (e.g., an amount of a discount, a product-specific limitation, etc.), and may identify a merchant associated with each of the promotional campaigns. In other examples, provisioned content database 134 may also include transaction data that is associated with the promotional data and that characterizes an outcome of the one or more promotional campaigns, such as an occurrence of a purchase transaction resulting from the one or more promotional campaigns (e.g., click-through data characterizing a purchase derived from elements of presented promotional data). As described in greater detail below, one or more machine learning algorithms, collaborative filtering algorithms, or clustering algorithms may be trained against, and adaptively improved using, certain portions of provisioned content database 134, including those portions that facilitate a correlation of specific combinations of digital content or promotional data with corresponding outcomes.

Referring back to FIG. 1, combination scheme data 136 may include data that supports the selective combination, ordering, and formatting of discrete elements of digital content to generate a single, aggregated digital content element suitable for provisioning to one or more network-connected devices. For example, and as described herein, combination scheme data 136 may include information that specifies or supports the application of one or more classification-based combination schemes, hierarchical combination schemes, or combination schemes based on content-specified weight factors to information characterizing the discrete elements digital content, which generates the aggregated digital content element for provisioning to the network-connected devices. In other examples, and consistent with the exemplary processes described herein, combination scheme data 136 may include additional or alternate information that supports the execution of, or the training and adaptive improvement of, one or more machine learning algorithms, clustering algorithms, or collaborative filtering algorithms, which when applied to the information characterizing the discrete elements of digital content, generate the aggregated digital content element, as described herein.

Further, in some examples, content provisioning system 130 may also maintain, within the one or more tangible, non-transitory memories, one or more executable application programs 138, such as a content generation engine 139. When executed by content provisioning system 130, content generation engine 139 may perform any of the exemplary processes described herein to dynamically and selectively combine and order elements of digital content to generate an aggregated element of digital content for provisioning to one or more network-connected devices, such as client device 102.

In one instance, content generation engine 139 may aggregate and order the digital content elements in accordance with one or more of the combination schemes described herein, e.g., as maintained within combination scheme data 136. In other instances, as described herein, content generation engine 139 may perform operations that dynamically determine a combination scheme consistent with characteristics of the digital content elements (e.g., content type, sources, generating users, etc.) and/or of one or more targeted users (e.g., portions of profile data maintained within customer database 132). Content generation engine 139 may, in further instances, perform additional operations that aggregate and order the digital content elements in accordance with the dynamically determined combination scheme.

Third-party targeting system 150 may, upon execution of stored software instructions, perform any of the exemplary processes described herein to identify one or more third parties, such as merchants, that are approved to provide digital content to an application program executed by one or more network-connected devices operating within environment 100. In further instances, described herein, third-party targeting system 150 may also filter the approved third parties, e.g., the approved merchants, in accordance with current geographic locations of the one or more network-connected devices, content-delivery preferences associated with the one or more network-connected devices, or with targeting data established by the approved third parties or merchants. By way of example, and in response to a targeted request received from content provisioning system 130, third-party targeting system 150 may access and obtain identifiers associated with one or more of the approved third parties, and provide the obtained third-party identifiers to content provisioning system 130 in response to the targeted request, either alone or with additional promotional data identifying and characterizing one or more promotional campaigns associated with the approved merchants.

To facilitate the performance of any of the exemplary third-party identification and targeting processes described herein, third-party targeting system 150 may maintain, within one or more tangible, non-transitory memories, a third party database 152 and a promotional campaign database 154. In one example, the third parties described herein may include one or more merchants, such as merchant 121, that offer products or services for sale to one or more customers, such as user 101, and third party database 152 may include structured or unstructured data records that maintain a value of one or more merchant-specific parameters that characterize each of the merchants. Examples of these merchant-specific parameter values include, but not limited to, a merchant name, a merchant type or classification (e.g., an assigned merchant classification code (MCC), a merchant address, or identifiers of one or more products or services offered for sale (e.g., an assigned universal product code (UPC).

In additional examples, the structured or unstructured data records of third party database 152 may also maintain, for each of the merchants, one or more unique merchant- or product-specific identifiers (e.g., collectively referred to as "merchant identifiers") that associate elements of digital content with the corresponding merchant or products offered for sale by the corresponding merchant. Further, third party database 152 may also include, within the structured or unstructured data records, merchant-specific targeting data that identifies or characterizes one or more customers or corresponding network-connected devices targeted to receive digital content related to or referencing the corresponding merchant.

Examples of the merchant identifiers include, but are not limited to, merchant- or product-specific hashtags (e.g., that characterize content within one or more social media or microblogging platforms, such as Facebook™, Instagram™, or Twitter™), merchant names or merchant acronyms, locational identifiers, merchant nicknames, or product names, nicknames, or acronyms. Further, the targeting data may include, but is not limited to, information that specifies one or more targeted geographic regions, information that specifies one or more demographic parameters or targeted customers (e.g. customer age, gender, education level, etc.), or information that identifies one or more targeted customers or corresponding devices (e.g., identifiers of specific customers or corresponding devices involved in prior purchase transactions at the corresponding merchant, etc.).

Promotional campaign database 154 may include structured or unstructured data records that identify and characterize one or more promotional campaigns associated with or implemented by corresponding ones of the merchants. Examples of these promotional campaigns include, but are not limited to, a discount on purchase transactions involving a corresponding merchant or on predetermined products or services offered for sale by the corresponding merchant, campaigns that bundle together groups of products or services (e.g., a "bundle" deal that enables a customer to purchase related products at a predetermined discount), or other merchant- or product-specific promotions. In some instances, and for a corresponding merchant (e.g., merchant 121), the structured or unstructured data records of promotional campaign database 154 may include the one or more merchant identifiers associated with merchant 121, along with promotional data that specifies values of parameters that characterize or specify a corresponding promotion campaign, e.g., a value of an applied discount, a campaign initiation date or time, a campaign duration, an impacted product or service, etc.

Content aggregation system 170 may, upon execution of stored software instructions, perform operations that receive and aggregate digital content elements accessible through one or more digital platforms maintained by network-connected systems or devices operating within environment 100. For example, the digital platforms may include a user- or location-based social media platform (e.g., Facebook™, Instagram™, LinkedIn™, Yelp™, TripAdvisor™, etc.) or a microblogging platform (e.g., Twitter™, Pinterest™, etc.), and content aggregation system 170 may receive, from these digital platforms, platform-specific data streams that include elements of digital content generated or published by users of corresponding ones of the digital platforms, e.g., through corresponding programmatic interfaces, such as platform-specific API. In some instances, the digital platforms may broadcast the platform-specific data streams at regular temporal intervals (e.g., as a push operation) or in response to certain events (e.g., a pull operation initiated by content aggregation system 170). In other examples, the digital platforms may be maintained by one or more providers of digital content (e.g., by Google™, etc.), and content aggregation system 170 may execute one or more application programs (e.g., data mining application or "scraping" applications) that obtain elements of digital content from web pages or other digital portals associated with digital content providers.

Content aggregation system 170 may aggregate and store the received digital content within one or more tangible, non-transitory memories, along with additional information that identifies a source of each element of received digital content. Further, and in response to a query received across network 120 (e.g., from content provisioning system 130), content aggregation system 170 may perform any of the exemplary processes described herein to identify elements of the stored digital content that reference one or more of the merchants and include corresponding ones of the merchant identifiers.

To facilitate the performance of these exemplary content aggregation processes, content aggregation system 170 may maintain, within one or more tangible, non-transitory memories, a digital content data store 172. In some examples, digital content data store 172 may include, within structured or unstructured data records, one or more elements of digital content obtained from corresponding ones of the digital platforms. Examples of the digital content include, but are not limited to, digital images or videos, digital content that includes reviews of merchants or products or services offered for sale by the merchants, or comments on the merchants or the products or services. Further, the structured or unstructured data records of content aggregation system 170 may also include, for each element of the digital content, additional information, e.g., metadata, that identifies and characterizes the corresponding digital platform, the user that generated the digital content, and the user-generated element of digital content.

Examples of the metadata include, but are not limited to, unique identifier of the digital platform (e.g., a platform type, a platform name, such as Facebook™, or an IP or MAC address associated with the digital platform, etc.), a unique identifier of the user (e.g., a login or handle assigned to the user by the digital platform, etc.), and/or information identifying a content type characterizing the user-generated element of digital content (e.g., digital image or video, text-based review, etc.). The disclosed embodiments are not limited to these examples of metadata, and in other examples, the metadata (and the structured or unstructured data records of digital content data store 172) may include any additional or alternate information that identifies or characterizes a digital platform, a user that generated digital content, and user-generated elements of digital content.

II. Exemplary Computer-Implemented Processes for Dynamically Generating and Provisioning Digital Content to Network-Connected Devices In some embodiments, a network-connected computing system, such as content provisioning system 130 of FIG. 1, may perform operations that obtain data identifying one or more third parties approved to distributed digital content to an application program executed by a client device, such as client device 102 of FIG. 1 (e.g., "approved" third parties, such as merchants). Based on the obtained data, content provisioning system may identify and obtain one or more elements of the digital content (e.g., "first" digital content elements) that include portions of the obtained data, and are related to or describe the one or more third parties or merchants. For example, and in response to a detected occurrence of a triggering event, content provisioning system 130 may request and receive the data identifying the approved third parties or merchants from one or more additional network-connected computing systems, such as third-party targeting system 150 of FIG. 1.

As described herein, examples of the triggering event include, among other things, a receipt of data from client device 102 (e.g., as generated by the executed application program without intervention from user 101) that identifies the executed application program or user 101, that identifies a current geographic location of client device 102, and/or that specifies one or more elements of profile data characterizing user 101. Further, the approved third parties may include one or more approved merchants, and the data identifying the approved merchants may, for example, include one or more unique identifiers of the approved merchants, or one or more unique identifiers of products or services offered for sale by the approved merchants. Examples of these merchant- or product-specific identifier may include, but are not limited to, merchant- or product-specific hashtags that characterize content within one or more social media or microblogging platforms, merchant names, nicknames, or acronyms, or product names, nicknames, or acronyms.

In further examples, the first digital content elements may include, among other things, one or more elements of digital content generated by a user of a digital platform, such as a user- or a location-based social media platform or a digital platform maintained by a content provider that publishes digital content. Examples of the user-generated digital content may include, but is not limited to, digital images or videos of the merchants of a products offered for sale by the merchants, digital content that includes user-generated reviews of the merchants or the offered products, or digital content that specifies user-generated comments on the merchants or the offered products, and as described herein, content provisioning system 130 may obtain one or more of the user-generated content elements from one or more network-connected computing systems, such as content aggregation system 170, based on portions of the merchant- or product-specific identifiers.

Content provisioning system 130 may perform additional operations that generate an aggregated element of digital content (e.g., a "second" digital content element) based on a dynamically selected and ordered combination of a subset of the first digital content elements. For example, and as described herein, content provisioning system 130 may generate the second digital content element based an application of one or more dynamic or adaptive combination schemes to information, e.g., metadata, that identifies and characterizes each of the first digital content elements, and examples of the combination schemes include, but are not limited to, classification-based combination schemes, hierarchical combination schemes, or combination schemes based on content-specific weight factors, combination schemes based on machine learning algorithms, clustering algorithms, or collaborative filtering algorithms, or combinations thereof.

In further examples, content provisioning system 130 may automatically transmit or "provision" the second digital content element to client device 102 without direct intervention from either client device 102 or a user that operates client device 102, such as user 101 of FIG. 1. As described herein, client device 102 may perform operations that present the second digital content element, which represents the dynamically selected combination of the first digital content elements, to user 101 on a corresponding interface generated by an executed application program, such as a mobile application associated with content provisioning system 130.

a. Exemplary Computer-Implemented Processes for Identifying and Obtaining Data Characterizing Third Parties Approved to Distribute Targeted Digital Content Referring to FIG. 2A, an initiation module 202 of client device 102 may access device data 108, e.g., as maintained within data repository 106, and obtain a device identifier 204, such as, but not limited to, an IP address or a MAC address that uniquely identifies client device 102 within environment 100. Initiation module 202 may also access application data 111, e.g., as further maintained within data repository 106, and obtain application identifier 206 that uniquely identifies an application program executed by client device 102. For example, initiation module 202 may represent a component of the executed application, which may be provided by maintained by content provisioning system 130 (e.g., a mobile application provided and regularly updated by content provisioning system 130). Further, application identifier 206 may include, among other things, a name or other unique identifier of the executed application program, version data characterizing the executed application program, or an identifier of a programmatic interface associated with the executed application program.

In some examples, initiation module 202 may package portions of device identifier 204 and application identifier 206 into request data 208, which client device 102 transmits across network 120 to content provisioning system 130, e.g., using any appropriate communications protocol. In one example, initiation module 202 may generate request data 208 without intervention from user 101, and client device 102 may transmit request data 208 to content provisioning system 130 at predetermined intervals or in response to occurrences of certain events, such as a change in an operational mode of client device 102 (e.g., a push operation). In other examples, the initiation and transmission of request data 208 may be responsive to a receipt, at client device 102, of request data transmitted by content provisioning system 130 (e.g., a pull operation).

A programmatic interface established and maintained by content provisioning system 130, such as application programming interface (API) 210, may receive request data 208 from client device 102. By way of example, API 210 may be associated with, and established and maintained by, a third-party targeting module 212 of content provisioning system 130, and may facilitate direct, module-to-module communications between initiation module 202 of client device 102 and third-party targeting module 212. API 210 may provide request data 208 as an input to third-party targeting module 212, which may perform operations that parse request data 208 to identify and extract application identifier 206. As described herein, application identifier 206 may identify the application program executed by client device 102 during subsequent processing by content provisioning system 130 or third-party targeting system 150, and third-party targeting module 212 may package application identifier 206 into a targeted request 214 (and additionally or alternatively, along with other information, such as device identifier 204).

Figure 2A:
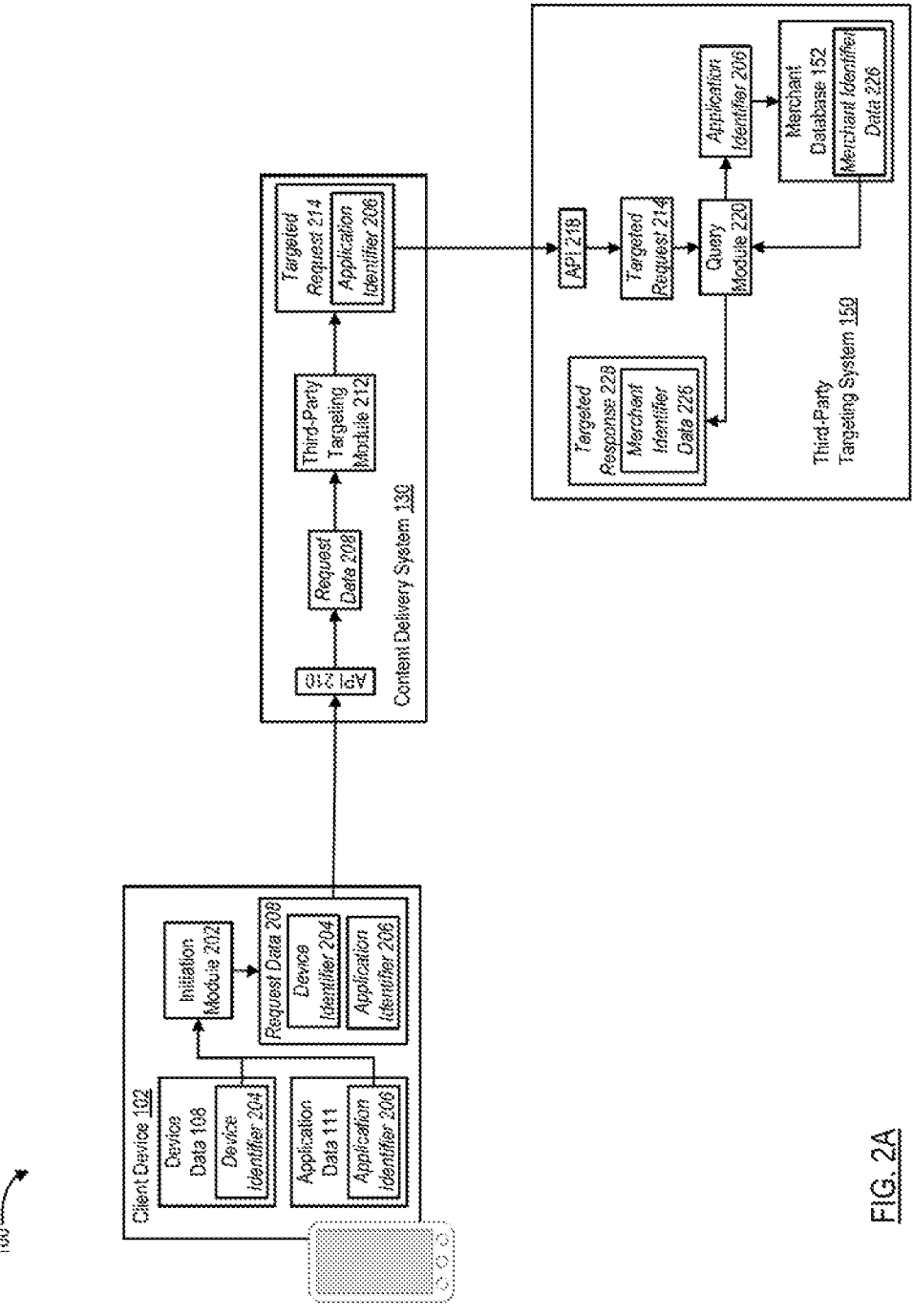
FIGS. 2A-2D are diagrams illustrating portions of an exemplary computing environment, consistent with the disclosed embodiments.

Content provisioning system 130 may perform operations that transmit targeted request 214 across network 120 to third-party targeting system 150, e.g., using any appropriate communications protocol. In one example, a programmatic interface established and maintained by third-party targeting system 150, such as application programming interface (API) 218, may receive targeted request 214 from content provisioning system 130. API 218 may be associated with, and established and maintained by a query module 220 of third-party targeting system 150, and may facilitate direct, module-to-module communications between third-party targeting module 212 of content provisioning system 130 and query module 220. As illustrated in FIG. 2A, API 218 may provide targeted request 214 as an input to query module 220, which may perform operations that parse targeted request 214 to identify and extract application identifier 206.

Query module 220 may access third party database 152 (e.g., as maintained within one or more tangible, non-transitory memories), and based on application identifier 206, may query third party database 152 to identify and extract data 226 associated with one or more merchants that are approved to provide digital content to the application program executed by client device 102 (e.g., one or more "approved" merchants). As described herein, content provisioning system 130 may maintain and provide the application program to client device 102 and additionally or alternatively, to other network-connected devices operating within environment 100). Further, in one example, content provisioning module 130 may approve a distribution of digital content to the executed application program by one or more merchants (e.g., conditional upon a payment of a predetermined tariff in fiat or virtual currency) and provide data indicative of the approval to third-party targeting system 150 (e.g., for inclusion within third-party database 152).

Referring back to FIG. 2A, data 226 may include one or more merchant identifiers that associate each of the approved merchants with corresponding elements of digital content (e.g., as maintained by content aggregation system 170). Examples of the merchant identifiers may include, but are not limited to, merchant- or product-specific social media tags, merchant names or merchant acronyms, locational identifiers, merchant nicknames, or other information capable of uniquely associating digital content the approved merchants or products offered for sale by the approved merchants.

For example, the approved merchants may include merchant 121 of FIG. 1, which may correspond to a yoga studio having multiple studio locations in and around Toronto, Canada. As described herein, the structured or unstructured data records may link application identifier 206 to additional stored data that includes one or more merchant identifiers associated with merchant 121, such as, but not limited to, the merchant name (e.g., a trade name of the yoga studio), one or more social media tags associated with the yoga studio (e.g., a hashtag, a handle, etc.), a web address of the yoga studio, or additional geographic location data that specifies each of the studio locations (e.g., a street address or a nearby corner). The disclosed embodiments are, however, not limited to these examples of approved merchants or merchant identifiers, and in other examples, third party database 152 and/or data 226 may include any additional or alternate merchant identifier that associates elements of digital content with any additional or alternate approved merchant.

In some examples, query module 220 may package extracted data 226, which includes the merchant identifiers of the approved merchants, into a targeted response 228, which third-party targeting system 150 may transmit across network 120 to content provisioning system 130, e.g., using any appropriate communications protocol. In response to a receipt of targeted response 228, content provisioning system 130 may perform any of the exemplary processes described herein to identify and obtain one or more elements of digital content, such as digital content elements generated by users of various digital platforms, that include or reference the merchant identifiers described herein and as such, that are relevant to or describe one or more of the approved merchants, or products or services offered for sale by the approved merchants.

As described herein, data 226 may include merchant identifiers associated with any number or merchants approved to distributed digital content to the application program executed by client device 102. For example, data 226 may include merchant identifiers of approved merchants that are disposed proximate to a current geographic location of client device 102 (e.g., a location of the yoga studio) and additionally or alternatively, additional approved merchants that are dispersed at substantial, and often inconvenient, distances from the current geographic location of client device 102. The elements of digital content associated with these dispersed approved merchants, when combined into an aggregated digital content element and provisioned to client device 102, may be less relevant to user 101 and less impactful than similar elements of digital content associated with those approved merchants disposed proximate to the geographic location of client device 102.

In further examples, described below in reference to FIG. 2B, content provisioning system 130 may perform operations that, in conjunction with third-party targeting system 150 and client device 102, obtain merchant identifiers associated with merchants not only approved to distribute digital content to the application program executed by client device 102 (e.g., based on application identifier 206), but also disposed proximate to a current geographic location of client device 102. By filtering the approved merchants based on the current geographic location of client device 102, certain of the exemplary processes described herein may increase a relevance of the generated and provisioned digital content elements to user 101, and this reduce a number of digital content elements that, when provisioned to client device 102, achieve a desired impact on the approved merchants. The reduction in the number of generated and/or provisioned digital content elements can, in some instances, increase an operational efficiency of content provisioning system 130 and reduce a volume of data exchanged between content provisioning system 130 and other network-connected systems and devices operating within environment 100, thus increasing an amount of available bandwidth and reducing a likelihood of malicious activity, such as man-in-the-middle attacks.

Figure 2B:
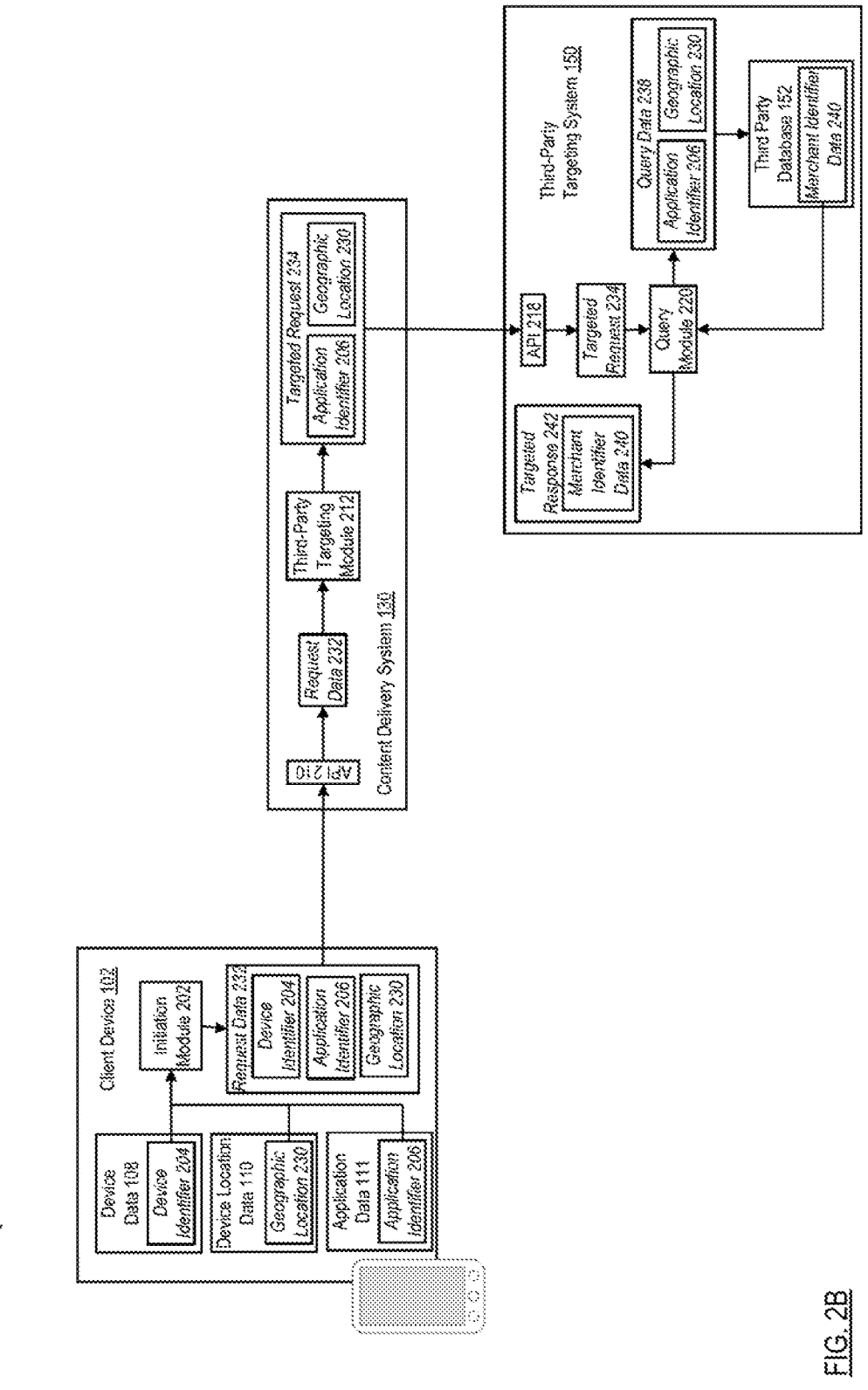

Referring to FIG. 2B, initiation module 202 of client device 102 may perform any of the exemplary processes described herein to extract, from data repository 106, device identifier 204, which uniquely identifies client device 102 within environment 100, and application identifier 206, which uniquely identifies the application program executed by client device 102 (e.g., the mobile application associated with initiation module 202 and provided or maintained by content provisioning system 130). Initiation module 202 may also access device location data 110, as also maintained within data repository 106, and obtain geographic location data 230 that characterizes a current geographic location of client device 102.

For example, positional unit 112D of client device 102 may determine a geographic location of client device 102 at regular or predetermined intervals (e.g., every five minutes, etc.) or in response to detected occurrences of certain events (e.g., the execution of the mobile application by client device 102, etc.). As described herein, positional unit 112D may store the determined geographic location within one or more data records of device location data 110, along with a corresponding date or time at which positional unit 112D determine the geographic location (e.g., a corresponding time stamp).

Initiation module 202 may perform any of the processes described herein to package portions of device identifier

204, application identifier 206, and geographic location data 230 into request data 232, which client device 102 may transmit across network 120 to content provisioning system 130, e.g., using any appropriate communications protocol. As described herein, initiation module 202 may generate request data 232 without intervention from user 101, and client device 102 may transmit request data 232 to content provisioning module 130, at predetermined intervals or in response to occurrences of certain events, such as a change in an operation mode of client device 102 (e.g., a push operation). In other examples, the initiation and transmission of request data 208 may be responsive to a receipt, by client device 102, of request data transmitted by content provisioning system 130 (e.g., a pull operation).

API 210 of content provisioning system 130 may receive and route request data 232 to third-party targeting module 212, which may perform operations that parse request data 232 to identify and extract application identifier 206 and geographic location data 230. As described herein, application identifier 206 may identify the application program executed by client device 102 during subsequent processing by content provisioning system 130 or third-party targeting system 150, and third-party targeting module 212 may package application identifier 206 and geographic location data 230 into a targeted request 234 (and additionally or alternatively, along with other information, such as device identifier 204). Content provisioning system 130 may transmit targeted request 234 across network 120 to third-party targeting system 150, e.g., using any appropriate communications protocol, and API 218 of third-party targeting system 150 may receive and route targeted request 234 to query module 220.

Query module 220 may parse targeted request 236 to identify and extract application identifier 206 and geographic location data 230, which may be packaged into query data 238. Query module 220 may access third party database 152, and based on portions of query data 238 (which includes application identifier 206 and geographic location data 230), query module 220 may query third party database 152 to identify and extract data 240 that identifies one or more of the merchants that are approved to provide digital content to the application program executed by client device 102 and further, that are associated with geographic locations that are proximate to the current geographic location of client device 102.

As described herein, the structured or unstructured data records of third party database 152 may associate each merchant with one or more corresponding application identifiers, one or more of the merchant identifiers described herein, and further, location data that specifies one or more geographic locations associated with the approved merchant. In some examples, and based on the accessed data records of third party database 152, query module 220 may identify one or more of the merchants associated with application identifier 206, which indicates that the identified merchants are approved (e.g., by content provisioning system 130) to distribute digital content to the application program executed by client device 102. Query module 220 may further process or filter the data records associated with the approved merchants to identify one or more of the approved merchants are associated with corresponding geographic locations that are disposed proximate to the current geographic location of client device 102.

In one example, query module 220 may establish that an approved merchant is disposed proximate to the current geographic location of client device 102 when a geographic location of the approved merchant (e.g., a merchant geographic location) is disposed within a threshold distance of the current geographic location of client device 102. The threshold distance may, in some instances, be established by third-party targeting system 150 based on data generated and provided by from merchant system 122 (e.g., based input provided by merchant 121), content provisioning system 130, or client device 102, and examples of the threshold distance may include, but are not limited to, 100 meters, 500 meters, one kilometer, or a unit of a municipal grid, such as a city block. In other examples, and without limitation, query module 220 may establish that an approved merchant is disposed proximate to the current geographic location of client device 102 when a merchant geographic location and the current geographic location of client device 102 are each disposed within a common geographic region, such as, but not limited to, a common zip code, a common neighborhood, or a common incorporated or unincorporated area.

In some examples, query module 220 may extract, from the structured or unstructured data records of third party database 152, data 240 that includes merchant identifiers associated with the one or more approved and proximately disposed merchants. Query module 220 may package extracted data 240, which includes the merchant identifiers of the approved and proximately disposed merchants, into a targeted response 242, which third-party targeting system 150 may transmit across network 120 to content provisioning system 130, e.g., using any appropriate communications protocol. In response to the receipt of targeted response 228, content provisioning system 130 may perform any of the exemplary processes described herein to identify and obtain one or more elements of digital content, such as digital content elements generated by users of various digital platforms that include one or more of the merchant identifiers included within data 226 and as such, that are relevant to or describe one or more of the approved merchants, or products or services offered for sale by those approved merchants.

In certain examples, described herein, content provisioning system 130 may, in conjunction with third-party targeting system 150, may perform operations that identify one or more merchants that are approved to distributed digital content to the application program executed by client device 102 and further, that are disposed proximate to the current (or the one or more prior) geographic locations of client device 102. By filtering the approved merchants based on the current or the prior geographic locations of client device 102, certain of the exemplary processes described herein may increase a relevance of the generated and provisioned digital content elements to user 101, and this reduce a number of digital content elements that, when provisioned to client device 102, achieve a desired impact on the approved merchants.

In additional examples, described below in reference to FIG. 2C, content provisioning system 130 may, in conjunction with third-party targeting system 150, further filter the approved and/or the proximately disposed merchants in accordance with preference data established by user 101 (e.g., based on input provided to client device 102) and additionally or alternatively, based on targeting data established by one or more of the approved and proximately disposed merchants (e.g., based on input provided to merchant 121 to merchant system 122). By filtering the approved and proximately disposed merchants in accordance with customer-specific preference data and/or merchant-specific targeting data, certain of the exemplary processes described herein may further target the generated and provisioned digital content elements to user 101, and further reduce a number of digital content elements that, when provisioned to client device 102, achieve a desired impact on user 101 and/or the approved merchants. This further reduction in the number of generated and/or provisioned digital content elements can, in some instances, increase an operational efficiency of content provisioning system 130 and reduce a volume of data exchanged between content provisioning system 130 and other network-connected systems and devices operating within environment 100, which collectively increasing an amount of available network bandwidth and reduce occurrences of malicious activity impacting the exchanged data.

Figure 2C:
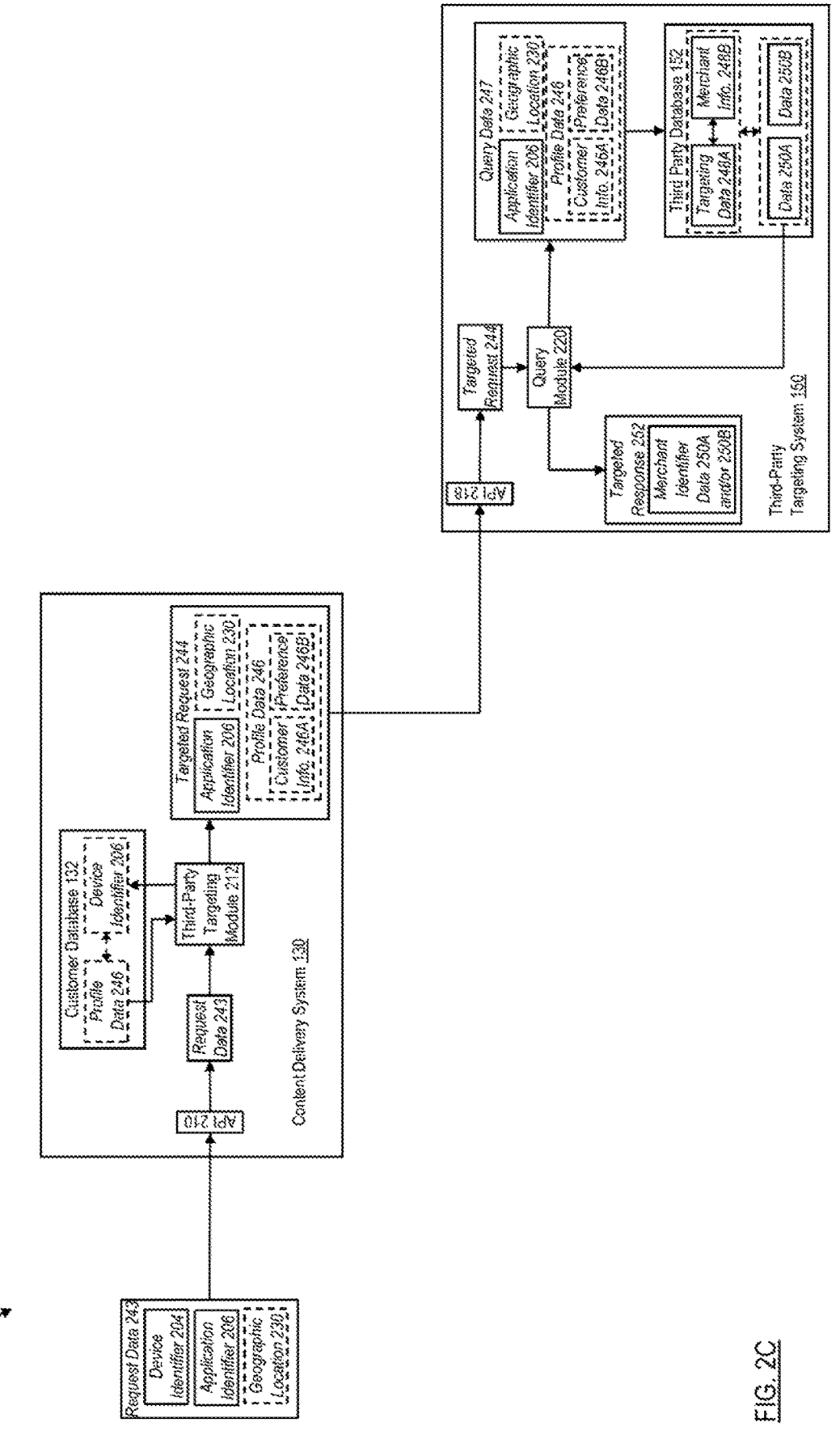

Referring to FIG. 2C, API 210 of content provisioning system 130 may receive request data 243, which may be generated by client device 102 and transmitted to content provisioning system 130 using any of the exemplary processes described herein. For example, request data 243 may include device identifier 204 (e.g., an IP or MAC address that uniquely identifiers client device 102 within environment 100) and application identifier 206 (e.g., an application name, version data, or an identifier of a programmatic interface associated with the executed application program). In other examples, and in addition to or as an alternate to device identifier 204 or application identifier 206, request data 243 may also include geographic location data 230 that identifies a current geographic location of client device 102 (e.g., as determined by positioning unit 112D of FIG. 2).

In some examples, API 210 may provide request data 243 as an input to third-party targeting module 212, which may parse request data 243 to extract device identifier 204 and application identifier 206. Third-party targeting module 212 may also perform any of the exemplary processes described to package application identifier 206 into a targeted request 244. Further, and as described herein, request data 243 may also include geographic location data 230, and third-party targeting module 212 may perform additional processes that package geographic location data 230 into targeted request 244, e.g., in conjunction with application identifier 206.

In other examples, illustrated in FIG. 2C, third-party targeting module 212 may access one or more structured data records of customer database 132, e.g., as maintained within one or more tangible, non-transitory memories, and identify and extract profile data 246 associated with, or linked to, device identifier 204 within customer database 132. Profile data 246 may, in some instances, include customer information 246A that identifies user 101 (e.g., a legal name or nickname of user 101, a home address of user 101, an employer or work address of user 101, etc.) and specifies one or more demographic characteristics of user 101 (e.g., an age, gender, a height or weight, interests or hobbies (e.g., international travel, wines, etc.), an educational or professional background, etc.). Further, and as described herein, profile data 246 may also include preference data 246B that specifies one or more one or more content-delivery preferences of user 101, such as, but not limited to, a preference to receive digital content related to particular merchants (e.g., merchant 121) or particular products or services, a preference to receive a particular type of digital content (e.g., video content, etc.), or a preference to receive, or not to receive, digital content derived from a particular source (e.g., a preference to receive content from Twitter™, etc.).

Referring back to FIG. 2C, third-party targeting module 212 may perform any of the exemplary processes described herein to package all or a portion of profile data 246 into targeted request 244 (e.g., which include application identifier 206 and in some instances, may also include location data 230). Content provisioning system 130 may then transmit targeted request 244 across network 120 to third-party targeting system 150, e.g., using any appropriate communications protocol, and API 218 of third-party targeting system 150 may receive and route targeted request 244 to query module 220. In some examples, query module 220 may perform operations that parse targeted request 244 to identify and extract application identifier 206 and profile data 246, which query module 220 may package into query data 247. Further, when targeted request 244 include location data 230, query module 220 may perform additional operations that identify and extract location data 230 from targeted request 233, and that package geographic location data 230 into query data 247 (e.g., in conjunction with application identifier 206 and profile data 246).

Query module 220 may access third party database 152, and may perform any of the exemplary processes described herein to identify one or more of the merchants associated application identifier 206, which indicates that the identified merchants are approved (e.g., by content provisioning system 130) to distribute merchant-specific digital content to the application program executed by client device 102. In additional examples, when query data 247 includes location data 230, query module 220 may also perform any of the exemplary processes described herein to process the data records associated with the approved merchants and identify one or more of the approved merchants that are disposed proximate to the current geographic location of client device 102. In further embodiments, described herein, query module 220 may perform additional operations that filter the approved (and in some instances, proximately disposed) merchants in accordance with one or more content-delivery preferences established by user 101 and additionally or alternatively, one or more customer-specific targets established by the approved (and in some instances, proximately disposed) merchants.

For example, a corresponding one of the approved and/or proximately disposed merchants may elect to target elements of digital content to a customer or network-connected device disposed within a predetermined geographic region or proximate to a predetermined geographic location (e.g., a targeted geographic region or location) and additionally or alternatively, to a customer exhibiting one or more predetermined demographic characteristics, such as an age or range of ages, a gender, or an educational or professional background (e.g., targeted demographic characteristics). In other examples, and without limitation, the corresponding one of the approved and/or proximately disposed merchants may target the digital content elements to a particular customer or to a particular network-connected device (e.g., customers or network-connected device involved in a prior purchase transaction). The targeting data may include information specifying the targeted geographic region or location, the targeted demographic characteristics, and/or identifiers of the particular customer or particular network-connected device, and as described herein, third-party targeting system 150 may maintain the targeting data associated with one or more of the approved and/or proximately disposed merchants within corresponding data records within third party database 152.

Referring back to FIG. 2C, query module 220 may access the structured and unstructured data records of third party database 152, and identify merchant-specific targeting data 248A associated with the approved (and in some instances, proximately disposed) merchants. Query module 220 may also parse profile data 246 to extract customer information 246A identifying user 101, a geographic region or location associated with user 101 or client device 102, and one or more demographic characteristics exhibited by user 101 (e.g., an age, gender, or educational or professional background of user 101, etc.).

In some examples, query module 220 may determine that at least a portion of customer information 246A is consistent with portions of targeting data 248A associated with a subset of the approved and/or proximately disposed merchants, and as such, that each of the subset of the approved and/or proximately disposed merchants elected to target digital content elements to user 101 or to client device 102. Query module 220 may further extract, from the structured or unstructured data records of third party database 152, data 250A that includes the merchant identifiers of the subset of the approved (and in some instances, proximately disposed) merchants that elected to target merchant-specific digital content to user 101 or to client device 102.

Query module 220 may also process profile data 246 to extract preference data 246B that specifies the one or more content-delivery preferences of user 101, and further, may identify and extract, from the structured or unstructured data records of third party database 152, merchant information 248B that specifies the values of merchant-specific parameters characterizing the approved (and in some instances, proximately disposed) merchants. In some examples, query module 220 may establish a consistency between preference data 246B and corresponding portions of merchant information 248B that characterize an additional subset of the approved and/or proximately disposed merchants, and as such, that each of the additional subset of the approved and/or proximately disposed merchants is consistent with the content-delivery preferences of user 101. Query module 220 may further extract, from the structured or unstructured data records of third party database 152, data 250B that includes the merchant identifiers of the additional subset of the approved (and in some instances, proximately disposed) merchants that are consistent with the content-delivery preferences of user 101.

Query module 220 may package extracted data 250A (e.g., which includes the merchant identifiers of the approved and/or proximately disposed merchants that also elected to target digital content elements to user 101 or to client device 102) and/or extracted data 250B (e.g., which includes the merchant identifiers of the approved and/or proximately disposed merchants that are also consistent with the content-delivery preferences of user 101) into a targeted response 252 for transmission across network 120 to content provisioning system 130. In response to the receipt of targeted response 252, content provisioning system 130 may perform any of the exemplary processes described herein to identify and obtain one or more elements of digital content, such as digital content elements generated by users of various digital platforms, that include one or more of the merchant identifiers included within data 250A and/or 250B and as such, that are relevant to or describe one or more of the approved merchants, or products or services offered for sale by the approved merchants.

In some examples, and in response to a targeted request received from content provisioning system 130, third-party targeting system 150 may perform any of the exemplary processes to identify and extract, from third party database 152, merchant identifiers associated with merchants approved to distribute digital content to the application program executed by client device 102 (e.g., merchant identifier data 226). Additionally, and as described herein, the extracted merchant identifiers may also be associated with approved merchants that are disposed proximate to a current geographic location of client device 102 (e.g., merchant identifier data 240), that elected to target merchant-specific digital content to user 101 or client device 102 (e.g., merchant identifier data 250A) and/or that are consistent with one or more content-delivery preferences of user 101 (e.g., merchant identifier data 250B).

As described herein, third-party targeting system 150 may package portions of merchant identifier data 226, 240, 250A, and/or 250B into a response to the targeted request, which third-party targeting system 150 may transmit across network 120 to content provisioning system 130. In additional examples, described below in reference to FIG. 2D, third-party targeting system 150 may also identify and obtain promotional data associated with one or more of the merchant identifiers described herein (e.g., as specified within one or more of merchant identifier data 226, 240, 250A, and/or 250B), and incorporate the obtained promotion data into the targeted response for transmission to content provisioning system 130.

Figure 2D:
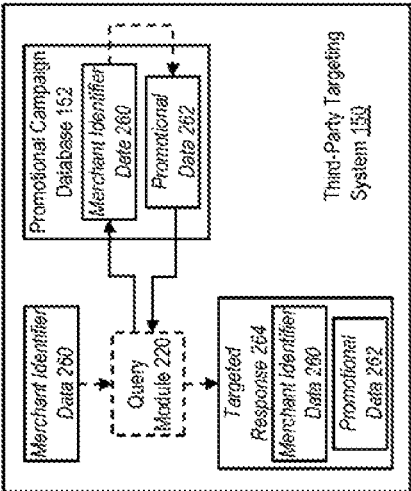
Figure 2D:

Referring to FIG. 2D, query module 220 of third-party targeting system 150 may perform any of the exemplary processes described herein to obtain, from third party database 152 (not illustrated in FIG. 2D), data 260 that includes merchant identifiers associated with one or more merchants, such as merchant 121. The merchant identifiers may associate elements of digital content with corresponding ones of the merchants and additionally or alternatively, with products or services offered for sale by the corresponding merchants, and examples of the merchant identifiers include, but are not limited to, merchant- or product-specific hashtags that characterize digital content within one or more social media or microblogging platforms, merchant names, nicknames, or acronyms, or product (or service) names, nicknames, or acronyms.

As described herein, each of the merchants may be approved (e.g., by content provisioning system 130) to distributed merchant-specific elements of digital content to application programs executed by one or more network-connected devices operating within environment 100, such as a mobile application associated with content provisioning system 130 and executed by client device 102. In additional examples, one or more of the approved merchants may also be disposed proximate to a current geographic location of client device 102, may also elect to target merchant-specific digital content to user 101 or client device 102, may also be consistent with one or more content-delivery preferences of user 101, or any combination therein.

In some examples, query module 220 may also access promotional campaign database 154, e.g., as maintained by third-party targeting system 150 within one tangible, non-transitory memories, and identify and obtain promotional data 262 associated with one or more portions of merchant identifier data 260, and as such, one or more of the approved merchants described herein. For instance, merchant identifier data 260 may include one or more merchant identifiers associated with merchant 121 (e.g., the yoga studio), which may be approved to distributed merchant-specific digital content to the application program executed by client device 102 (and further, may also be disposed proximate to a current geographic location of client device 102, may elect to target merchant-specific digital content to user 101, or may be consistent with one or more content-delivery preferences of user 101). Promotional data 262 may, in some instances, include promotional digital content establishing one or more promotional campaigns involving merchant 121, along with values of one or more parameters that characterize the promotional campaigns. Examples of the parameter values include, but are not limited to, a value of an applied discount, a campaign initiation date or time, a campaign duration, or an impacted product or service offered for sale by merchant 121.

Referring back to FIG. 2D, query module 220 may package portions of merchant identifier data 260, which includes merchant identifiers of the one or more approved merchants, and promotional data 262, which specifies and characterizes the promotional campaigns associated with the one or more approved merchants, into a targeted response 264. By way of examples, and for merchant 121 (e.g., the yoga studio), merchant identifier data 260 may specify merchant identifiers that include, among other things, the merchant name, one or more social media tags associated with the yoga studio, a web address of the yoga studio, or additional location data that specifies each of the studio locations or merchant 121 (e.g., a street address or a nearby corner).

Further, promotional data 262 may characterize a promotion campaign through which merchant 121 offers a 10% discount on a yoga class scheduled by user 101 at the yoga studio prior to Jan. 1, 2018, and may specify parameter values that include, but are not limited to, the value of the applied discount (e.g., 10%), a duration of the applied discount (e.g., on or before Jan. 1, 2018), and the product impacted by the discount (e.g., a newly scheduled yoga class). In some examples, third-party targeting system 150 may transmit targeted response 264 across network 120 to content provisioning system 130, which may perform any of the exemplary processes described herein to identify and obtain one or more elements of digital content that include one or more of the merchant identifiers, and that combine the obtained elements of digital content, along with portions of the promotional data 262, to generate an aggregated element of digital content for provisioning to client device 102.

b. Exemplary Computer-Implemented Processes for Dynamically Obtaining, Generating, and Provisioning Targeted Digital Content to Selected Network-Connected Devices In some examples, and in response to a targeted request received from content provisioning system 130, third-party targeting system 150 may perform any of the exemplary processes described herein to obtain data that, when included within an element of digital content, associates that element of digital content with one or more merchants, or with products or services offered for sale by the merchants. In some examples, as described herein, each of the merchants may be approved to distribute digital content to the application program executed by client device 102 (e.g., and may represent "approved" merchants), and the obtained data may include one or more merchant- or product-specific identifiers. Further, and in other examples, one or more of the approved merchants may be disposed proximate to a current geographic location of client device 102, may elect to target digital content to user 101 or client device 102, may be consistent with one or more content-delivery preferences of user 101, or any combination thereof.

Third-party targeting system 150 may perform operations that package the obtained data, e.g., the merchant identifiers, into a response to the targeted request, which third-party targeting system 150 may transmit across network 120 to content provisioning system 130, e.g., through a corresponding programmatic interface. In some examples, content provisioning system 130 may perform operations that identify and obtain one or more elements of digital content that include, or reference, at least a portion of the merchant identifiers, and that combine the obtained elements of user-generated content to generate an additional element of digital content (e.g., an "aggregated" element of digital content) for provisioning to client device 102.

Figure 3A:
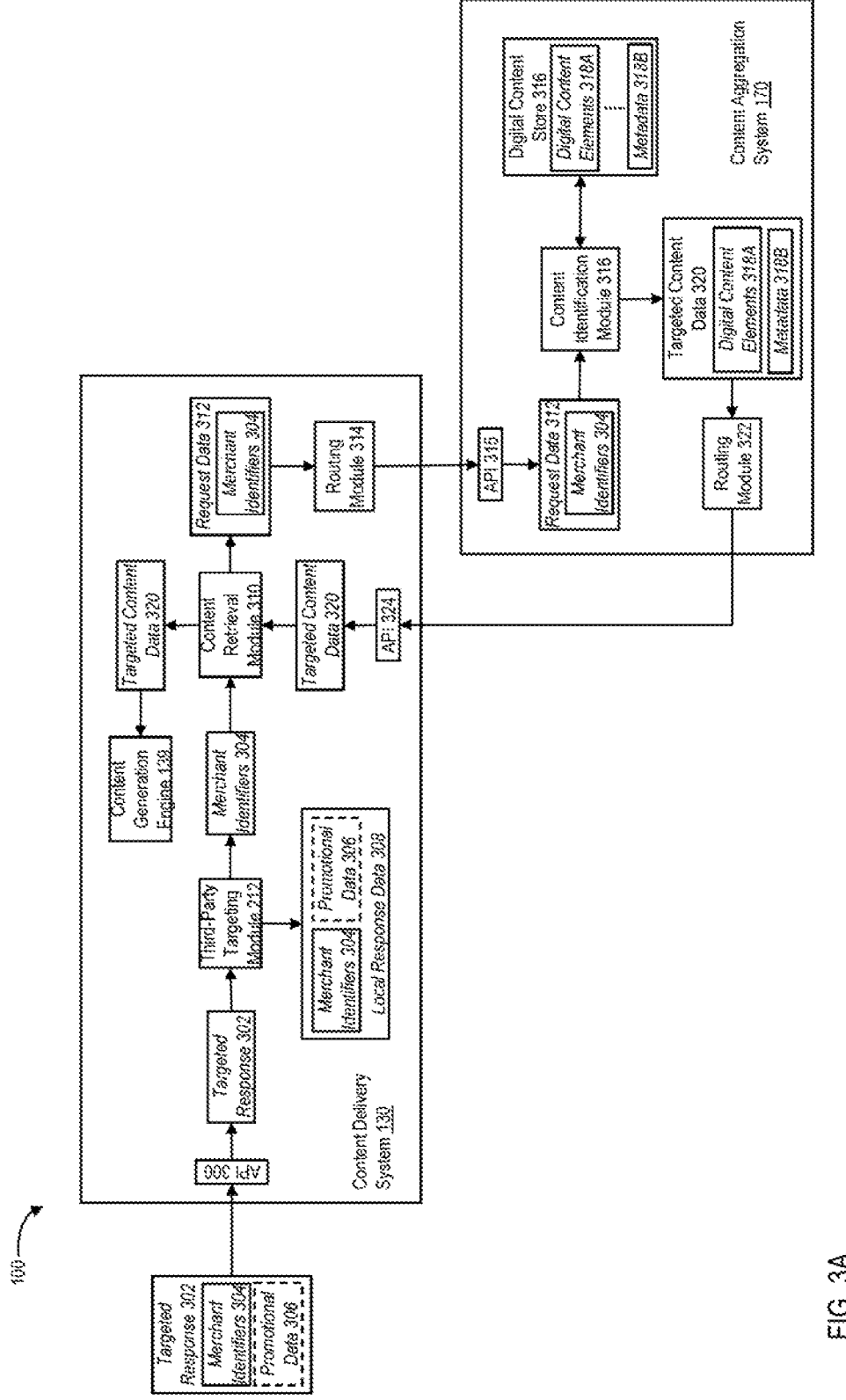
FIGS. 3A-3C are diagrams illustrating additional portions of an exemplary computing environment, consistent with the disclosed embodiments.

Referring to FIG. 3A, a programmatic interface of content provisioning system 130, e.g., application programming interface (API) 300, may receive targeted response 302 and route targeted response 302 to third-party targeting module 212. API 300 may be associated with or established by third-party targeting module 212, and may facilitate secure, module-to-module communications across network 120 between third-party targeting module 212 and query module 220 of third-party targeting system 150 (not illustrated in FIG. 3A).

Targeted response 302 may include merchant identifier data 304, which associates element of digital content with one or more merchants, or with products or services offered for sale by the one or more merchants, and in some instances, promotional data 306, which identifies and characterizes promotional campaigns associated with the one or more merchants. Merchant identifier data 304 may, for example, include one or more merchant specific identifiers, such as, but are not limited to, merchant- or product-specific hashtags (e.g., that characterize content within one or more social media or microblogging platforms, such as Facebook™, Instagram™, or Twitter™), merchant names or merchant acronyms, locational identifiers, merchant nicknames, or product names, nicknames, or acronyms. Additionally, in some examples, promotional data 306 may include elements of digital content that establish each of the promotional campaigns, information (e.g., metadata) characterizing the elements of digital content, and values of one or more parameters that characterize the promotional campaigns (e.g., an amount of a discount, a promotion duration, etc.).

As described herein, each of the merchants may be approved to distribute elements of digital content to an application program executed by client device 102, such as mobile application associated with content provisioning system 130 (e.g., and may represent approved merchants). Further, one or more of the approved merchants may also be disposed proximate to a current geographic location of client device 102, may also elect to target a distribution of digital content to user 101 or client device 102 (e.g., that characteristics of user 101 or client device 102 are consistent with corresponding merchant-specific targeting data), and additionally or alternatively, may be consistent with one or more content-delivery preference of user 101. In some instances, API 300 may be associated with, and established and maintained by third party targeting module 212 of content provisioning system 130, and may facilitate direct, module-to-module communications between third-party targeting module 212 and query module 220 of third-party targeting system 150 (not depicted in FIG. 3A).

In some examples, third-party targeting module 212 may store targeted response 302 within one or more tangible, non-transitory memories, e.g., as local response data 308, and may parse targeted response 302 to extract merchant identifier data 304. A content retrieval module 310 of content provisioning system 130 may receive merchant identifier data 304, e.g., as an input from third-party targeting module 212, and may package all or a portion of merchant identifier data 304 into request data 312, along with additional or alternate data identifying content provisioning system 130, such as an IP address, a MAC address, or another unique network identifier. A routing module 314 of content provisioning system 130 may receive request data 312 from content retrieval module 310, and may access one or more tangible, non-transitory memories and obtain data identify a network address of content aggregation system 170, which may be configured to identify and obtain elements of user-generated digital content that include, or reference, one or more of the merchant identifiers specified within request data 312. Routing module 314 may transmit request data 312 across network 120 to the network address of content aggregation system 170, e.g., using any appropriate communications protocol.

A programmatic interface of content aggregation system 170, e.g., API 315, may receive and route request data 312, which includes merchant identifier data 304, to a content identification module 316. API 315 may be associated with or established by content identification module 316, and may facilitate secure, module-to-module communications across network 120 between content identification module 316 and routing module 314 of content provisioning system 130. In some examples, content identification module 316 may parse request data 312 to extract merchant identifier data 304, may access digital content data store 172, and may perform operations that identify one or more elements of stored digital content that include or reference corresponding ones of the merchant identifiers, e.g., as specified within merchant identifier data 304.

For example, and as described herein, digital content data store 172 may maintain, within structured or unstructured data records, one or more elements of digital content obtained from corresponding digital platforms. In some instances, the maintained elements of digital content may include one or more elements of digital content (e.g., user-generated elements of digital content) generated by corresponding users of the digital platforms, e.g., based on input provided to corresponding network-connected devices, such as client device 102. Examples of the user-generated elements of digital content may include, but is not limited to, digital images or videos associated with the approved merchants (or of products or services offered for sale by the approved merchants), digital content that includes user-generated reviews of the approved merchants or the products or services, or digital content that specifies user-generated comments on the approved merchants or on the products or services. Further, examples of the digital platforms include, but are not limited to, user- and location-based social media platforms (such as Facebook™, Instagram™, Yelp™ TripAdvisor™), micro-blogging platforms (such as Twitter™), and other content providers (such as Google™ or Google Maps™) that publish user-generated digital content relevant to one or more of the approved merchants.

In further instances, the structured or unstructured data records of digital content data store 172 may also include, for each element of digital content, additional information, e.g., metadata, that identifies and characterizes the corresponding digital platform, the user that generated the digital content, and the user-generated element of digital content. Examples of the metadata include, but are not limited to, unique identifier of the digital platform (e.g., a platform type, a platform name, such as Facebook™, or an IP or MAC address associated with the digital platform, etc.), a unique identifier of the user (e.g., a login or handle assigned to the user by the digital platform, etc.), and/or information identifying a content type characterizing the user-generated element of digital content (e.g., digital image or video, text-based review, etc.).

Referring back to FIG. 3A, content identification module 316 may process the accessed digital content elements and/or the corresponding metadata to identify one or more of the digital content elements that include, or reference, portions of the merchant identifiers. In some instances, content identification module 316 may identify occurrences of the merchant identifiers within the accessed digital content elements based on an application of one or more digital image processing algorithms to the accessed digital content elements. Examples of these digital image processing algorithms may include, but are not limited, adaptive or machine learning algorithms, feature or text recognition algorithms, pattern-recognition algorithms, or combinations thereof. In other instances, content identification module 316 may parse textual content incorporated into one or more of the digital content elements to detect the occurrences of the merchant identifiers.

Further, and in additional or alternate instances, content identification module 316 may also parse the additional information, e.g., the metadata, characterizing one or more of the digital content elements to identify occurrences of the merchant identifiers and as such, establish that the one or more digital content elements reference corresponding ones of the merchant identifiers. The disclosed embodiments are, however, not limited to these exemplary identification or detection processes, and in other examples, content identification module 316 may identify elements of digital content that include, or reference, portions of the merchant identifiers based on an application of any additional or alternate algorithm, technique, or process to portions of digital content data store 172.

Content identification module 316 may extract, from the structured or unstructured data records of digital content data store 172, one or more digital content elements 318A that include, or reference, the merchant identifiers specified within merchant identifier data 304, along with additional data, e.g., metadata 318B, that identifies and characterizes each of digital content elements 318A. In some examples, one or more of digital content elements 318A may include elements of digital content generated or published by generated by corresponding users of the digital platforms described herein (e.g., social media platforms, microblogging platforms, digital platforms maintained by content providers, etc.), and may represent user-generated elements of digital content. Content identification module 316 may package all or a portion of digital content elements 318A and metadata 318B into user targeted content data 320, which content identification module 316 may provide as an input to routing module 322.

By way of example, targeted content data 320 may include one or more elements of digital content that include, or reference, merchant identifiers associated with merchant 121, such as the yoga studio described herein (e.g., having multiple studio locations in and around Toronto, Canada). For instance, digital content elements 318A may include a digital image or video associated with merchant 121, such as an image or video captured at one or more locations of the yoga studio or an image or video related to the one or more locations of the yoga studio.

The digital image or video may be published by one or more users of a social media platform (e.g., Facebook™ or Instagram™) and further, may reference corresponding ones of the merchant identifiers of merchant 121 (e.g., a social media tag). In some instances, the portions of metadata 318B that describe these extracted digital images or digital videos may identify, among other things, a particular format of the digital content (e.g., a JPEG or WMV file format), a digital platform that published the digital content element (e.g., social media platforms, such as Instagram™ Facebook™, etc.), and a user of the digital content that generated the digital content (e.g., a login credential or handle of the generating user within the digital platform In other examples, digital content elements 318A may also include a user-generated review of, or user-generated comments on, merchant 121 or a product or service offered for sale by merchant 121 (e.g., user-generated reviews of, or comments on the yoga studio, a particular class offered by the yoga studio, or a particular instructor). As described herein, the reviews or comments may be generated by one or more users of a social media platform (e.g., Yelp™ or Instagram™) or a content provider (e.g., Google Maps™), and further, may include corresponding ones of the merchant identifiers of merchant 121 (e.g., the merchant name, a social media tag, etc.). Further, the portions of metadata 318B that describe these extracted reviews or comments may identify, among other things, a digital platform that published the digital content element (e.g., social media platforms, such as Yelp™ or Instagram™, digital content providers, such as Google Maps™, etc.), and a user of the digital content that generated the digital content (e.g., a login credential or handle of the generating user within the digital platform, etc.).

The disclosed embodiments are, however, not limited to these examples of extracted digital content, and in other examples, content identification module 316 may extract any additional or alternate element of digital content (and corresponding metadata) from digital content data store 172 that includes or references one or more of the merchant identifiers and would be appropriate for provisioning to client device 102 using any of the exemplary processes described herein. For example, and in additional to the exemplary digital content elements described herein, content identification module 316 may also extract elements of digital content (and corresponding metadata) that identify merchant 121 (e.g., a web address), a location of merchant 121 (e.g., a street address), or other information that, when provisioned to client device 102, would facilitate access to merchant 121 by user 101, and package portions of these additional extracted elements of digital content into portions of targeted content data 320.

Routing module 322 may obtain data identifying a network address of content provisioning system 130 (e.g., from one or more tangible, non-transitory memories), and may transmit targeted content data 320 across network 120 to the network address of content provisioning system 130 using any appropriate communications protocol. As illustrated in FIG. 3A, a programmatic interface of content provisioning system 130, such as API 324, may receive and route targeted content data 320 to content retrieval module 310. In some instances, API 324 may be associated with or established by content generation engine 139, and may facilitate secure, module-to-module communications across network 120 between content retrieval module and routing module 322 of content aggregation system.

Further, content retrieval module 310 may store all or a portion of targeted content data 320 within one or more tangible, non-transitory memories, and provide targeted content data 320 as an input to content generation engine 139 of content provisioning system 130. As described below in reference to FIGS. 3B and 3C, content generation engine 139 may perform operations that dynamically and selectively aggregate corresponding ones of digital content elements 318A into an aggregated element of digital content, either alone or in combination with additional digital content elements associated with one or more promotional campaigns, and that provision the aggregated digital content element to client device 102 for presentation on an interface generated by the executed application program.

Figure 3B:
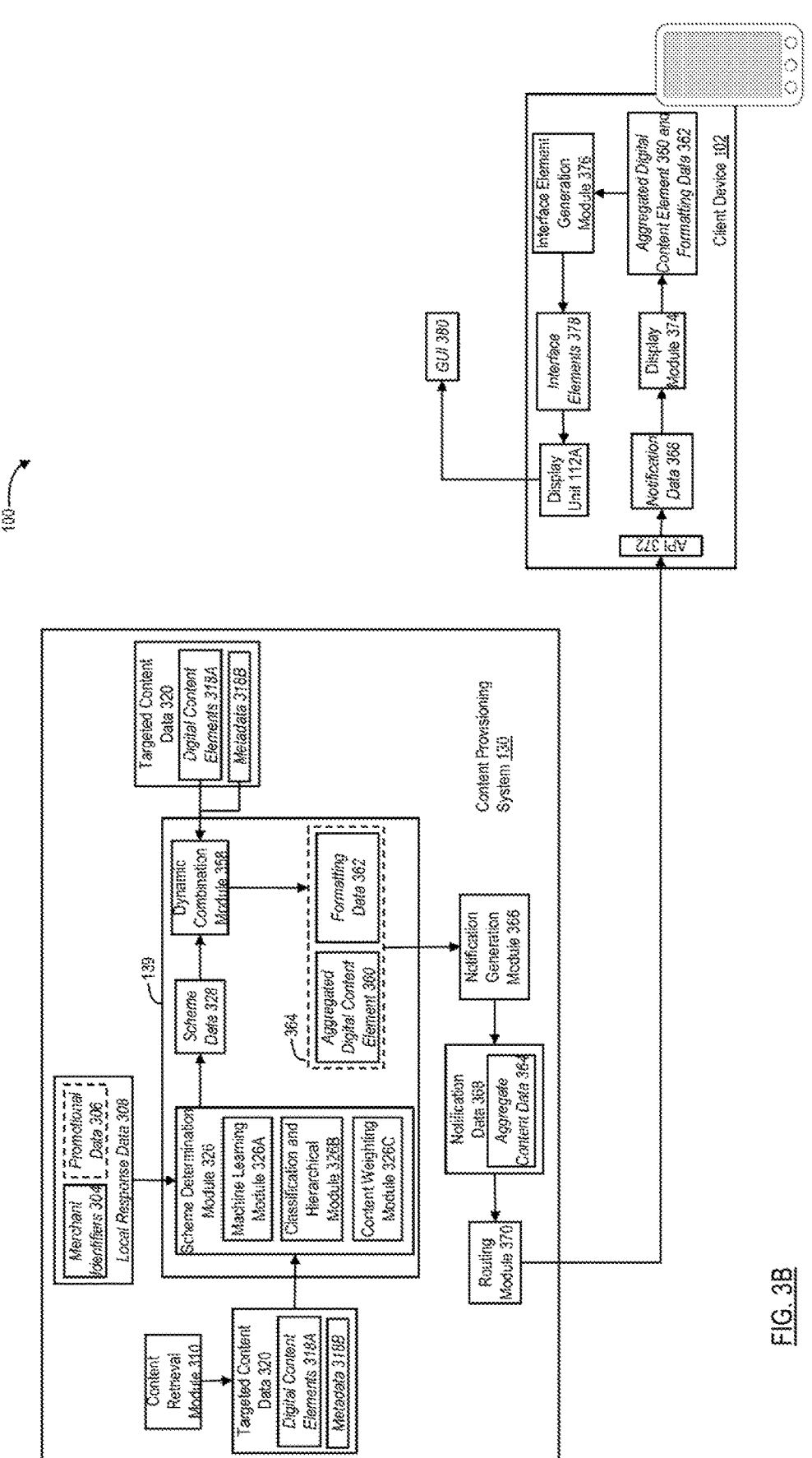

Referring to FIG. 3B, content generation engine 139 may receive targeted content data 320, which includes digital content elements 318A and corresponding metadata 318B, as an input from content retrieval module 310. In some examples, a scheme determination module 326 of content generation engine 139 may access targeted content data 320, and in some instances, may also access local response data 308 (e.g., as maintained within the one or more tangible, non-transitory memories) and extract promotional data 306, which identifies and characterizes one or more promotional campaigns associated with corresponding ones of the approved merchants associated with merchant identifier data 304.

Based on portions of metadata 318B (and in some instances, promotional data 306), scheme determination module 326 may perform operations that dynamically select corresponding ones of digital content elements 318A (and in some instances, additional digital content elements associated with the one or more promotional campaigns) for inclusion within the aggregated digital content element. Further, and using any of the processes described herein, scheme determination module 326 may also generate scheme data 328 that identifies not only the selected digital content elements (e.g., the corresponding ones of digital content elements 318A and/or the digital content elements associated with the one or more promotional campaigns), but also identifies and characterizes a scheme (e.g., a "combination" scheme) for dynamically combining and ordering the selected digital content elements within the aggregated digital content element for provisioning to client device 102.

In one instance, scheme determination module 326 may perform operations that dynamically select the digital content elements for inclusion into the aggregated digital content element, and that generate corresponding portions of schema data 328, in accordance with one or more machine learning algorithms or adaptive processes. For example, scheme determination module 326 may include a machine learning module 326A, which may access metadata 318B (and in some instances, promotional data 306), and further access portions of combination scheme data 136 (e.g., as maintained by content provisioning system 130 in one or more tangible, non-transitory memories) that specify and/or support the execution of the one machine learning algorithms or adaptive processes. Machine learning module 326A may, in some examples, dynamically select the digital content elements for inclusion into the aggregated digital content element and generate corresponding portions of schema data 328 based on an application of the one or more machine learning algorithms or adaptive processes to portions of metadata 218 (and in some instances, promotional data 306).

Examples of the one or more machine learning algorithms or adaptive processes include, but are not limited to, an association-rule algorithm (such as an Apriori algorithm, an Eclat algorithm, or an FP-growth algorithm), a clustering algorithm (such as a hierarchical clustering module, a k-means algorithm, or other statistical clustering algorithms), a collaborative filtering algorithm (such as a memory- or model-based algorithm), or an artificial intelligence algorithm (such as an artificial neural network). Further, and as described herein, one or more of these machine learning algorithms or adaptive process may be trained against, and adaptively improved using, certain portions of provisioned content database 134, including those portions that facilitate a correlation of specific combinations of digital content elements or promotional data with corresponding outcomes.

In other instances, scheme determination module 326 may perform operations that dynamically select the digital content elements for inclusion into the aggregated digital content element, and that generate corresponding portions of schema data 328, in accordance with one or more classification or hierarchical processes. For example, a classification or hierarchical module 326B may access combination scheme data 136 and extract information that specifies and characterizes the one or more classification or hierarchical processes. Classification or hierarchical module 326B may also access metadata 318B (and in some instances, promotional data 306), and may dynamically select the digital content elements for inclusion into the aggregated digital content element and generate corresponding portions of schema data 328 based on an application of the one or more classification or hierarchical processes to portions of metadata 218 (and in some instances, promotional data 306).

By way of example, the one or more classification or hierarchical processes may selectively combine elements of digital content based on factors that include, but are not limited to, determined similarities between particular classes or types that characterize digital content elements, determined relationships between elements the particular classes or types, or established similarities or relationships between particular digital content elements. For example, the extracted information that specifies and characterizes the one or more classification or hierarchical processes may include, among other things, one or more classification rules that specify and inclusion of certain classes or types of digital content elements within the aggregated digital content element (e.g., digital content elements published by specified digital platforms, such as social media platforms, or digital content have specified formats, such as digital images, a user-generated reviews, digital content, etc.), or that specify an ordering or a positioning of certain types of classes of digital content within the aggregated digital content element (e.g., a sequential order of certain classes or types of digital content, a requirement that user-generated reviews should be disposed within the aggregated digital content element to obscure portions of a digital image, etc.)

In additional examples, the extracted information that specifies and characterizes the one or more classification or hierarchical processes may include, among other things, one or more hierarchical rules that specify a hierarchical relationship between types or classes of digital content (e.g., a hierarchical relationship between a user-generated review and additional digital content identifying a user that generated the review), and that specify a ordering of one or more digital content elements within the aggregated digital content element in accordance with the established hierarchical relationship. In other examples, certain of the classification or hierarchical processes may dynamically identify (or order) digital content elements based on a computed metric of similarity or dissimilarity, or through the application of one or more of the machine learning or adaptive processes described herein to portions of metadata 318B and/or promotional data 304 (e.g., one or more clustering or collaborative filtering algorithms, etc.). The disclosed embodiments are, however, not limited to these exemplary classification or hierarchical processes, and in other examples, classification and hierarchical module 326B may apply any additional or alternate classification or hierarchical process that would be appropriate to digital content elements 318A, metadata 318B, and/or promotional data 306.

In additional or alternate examples, a content weighting module 326C of scheme determination module 326 may generate portions of scheme data 328 based on weight factors computed for and assigned to corresponding ones of the digital content elements 318A and in some instances, digital content elements associated with the one or more promotional campaigns (e.g., as specified within promotional data 306). As described below in reference to FIG. 3C, content weighting module 326C may compute or more preliminary weight factors for each of the elements of digital content, and may combine corresponding ones of the preliminary weight factors to generate an aggregated weight factor indicative of an importance, a relevance, and an impact of each element of digital content on user 101. In one instance, the preliminary and aggregated weight factors may include numerical weight factors scaled from zero (e.g., indicative of minimal importance or relevance) to unity (e.g., indicative of a maximum importance or relevance), although in other instances, content weighting module 326C may generate additional or alternate numerical or non-numerical weight factors that would be appropriate to the digital content elements.

Figure 3C:
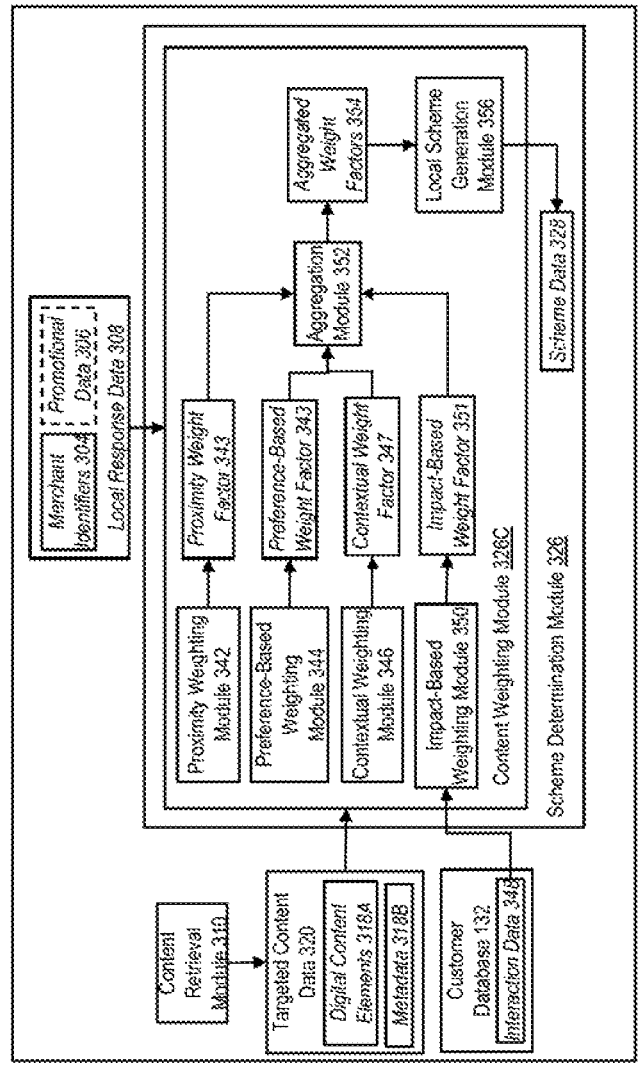

Referring to FIG. 3C, content weighting module 326C may access targeted content data 320, which includes digital content elements 318A and metadata 318B that identifies and characterizes each of digital content elements 318A. Further, content weighting module 326C may also access local response data 308, as maintained within one or more tangible non-transitory memories, and extract promotion data 306, which includes one or more elements of digital content associated with promotional campaigns of the approved merchants (and additional information identifying and characterizing each promotional campaign). As illustrated in FIG. 3C, one or more modules of content weighting module 326C may receive portions of targeted content data 320 and promotional data 306, and compute corresponding one or more preliminary weight factors described herein for each of the elements of digital content, e.g., user-generated and/or promotional digital content elements.

In some instances, and based on portions of metadata 318B (and in some instances, promotional data 306), a proximity weighting module 342 of content weighting module 326C may compute a proximity weight factor 343 indicative of an importance or relevance of each of the user-generated digital content elements (and in some instances, each of the promotional content elements) to a current geographic location of user 101 or client device 102, e.g., as maintained within customer database 132. By way of example, proximity weighting module 342 may assign a larger preliminary weight factor to a digital content element of local relevance to user 101 (e.g., a local concert occurring proximate to user 101's current geographic location, or to a local weather report for user 101's current geographic location) than to an additional digital content element lacking local relevance to user 101.

In other instances, and also based on portions of metadata 318B (and in some instances, promotional data 306), a preference-based weighting module 344 of content weighting module 326C may compute a preference-based weight factor 345 indicative of consistency of the user-generated digital content elements (and in some instances, the promotional content elements) with one or more content-delivery preferences of user 101. In some examples, preference-based weighting module 344 may preference-based weight factor 345 based on stored preference data characterizing the content-delivery preferences of user 101 (e.g., as maintained within profile data 246 of customer database 132). In other examples, preference-based weighting module 344 may determine one or more of the content-delivery preferences of user 101 based on an application of a machine learning or collaborative filtering algorithm to data specifying demographic characteristics of user 101 (e.g., as maintained within profile data 246 of customer database 132) and additional data specifying demographic characteristics and content-delivery preferences of other users operating network-connected devices within environment 100 (e.g., as further maintained within customer database 132)

Additionally, and as illustrated in FIG. 3C, a contextual weighting module 346 may establish a contextual weight factor 347 that reflects, among other things, a contextual relationship between the digital content elements, or users that generated the digital content elements, and an activity of user 101 within one or more digital platforms that publish the generated content elements. In some examples, and for a corresponding element of digital content (e.g., one of digital content elements 318A), metadata 318B may include information identifying a user that generated the corresponding digital content element (e.g., a "generating user") and a digital platform that published the corresponding digital content element (e.g., Facebook™, Twitter™, Yelp™, Instagram™, Google Maps™, etc.). Further, contextual weighting module 346 may also access interaction data 348, e.g., as maintained within customer database 132, that identifies and characterizes an activity of user 101 within the digital platform that published the corresponding digital content element.

Interaction data 348 may, in some instances, include information that identifies one or more elements of digital content generated and published by user 101 within the digital platform, and further, information identifying one or more additional users connected to user 101 within the digital content within the digital platform (e.g., additional users followed by user 101, etc.). In additional or alternate instances, interaction data 348 also include information that identifies and characterizes an activity of the generating user within the digital platform, such as information identifying other elements of digital content published by the generating user and additional users connected to the generating user within the digital platform.

Based on portions of interaction data 348, contextual weighting module 346 may determine a value of one or more metrics indicative of a relationship between user 101 and the generating user within the digital platform, and may compute contextual weight factor 347 for the corresponding digital content element based on the determined metric values. The determined metric values may, in some instances, characterize a directness of the connection between user 101 and the generating user within the digital platform and may include, among other things, a computed distance (e.g., a "separation" or "friend" distance) that separates user 101 and the generating user within the digital platform. For example, user 101 and the generating user may be directly connected within the digital platform (e.g., user 101 follows the generating user, or the generating user follows user 101), and the computed separation distance between user 101 and the generating user may be zero. In other examples, user 101 and the generating user may be connected within the digital platform through one or more additional users, e.g., intervening users, and the computed separation distance between user 101 and the generating user may correspond to the number of intervening users, e.g., one, three, etc.

In some examples, contextual weighting module 346 may assign a value to contextual weight factor 347 that is inversely proportional to the separation distance computed for the corresponding digital content element. For instance, digital content elements 318A may include three elements of digital content, such as a first review of merchant 121 (e.g. the yoga studio) generated by a first user of a first digital platform (e.g., Facebook™), a second review of merchant 121 generated by a second user within a second digital platform (e.g., Instagram™), and comments on merchant 121 generated by third user of a third digital platform (e.g., Yelp™). In certain instances, and based on portions of interaction data 348, contextual weighting module 346 may compute a separation distance of three for the first digital content element (e.g., indicating that user 101 and the first user are indirectly connected within Facebook™ and separated by three intervening users), a separation distance of zero for the second digital content element (e.g., indicating that user 101 and the second user are directly connected within Instagram™), and a separation distance of one for the third digital content element (e.g., indicating that user 101 and the third user are indirectly connected within Yelp™ and separated by a single intervening user).

Contextual weighting module 346 may compute values of contextual weight factor 347 for the first digital content element (e.g., the Facebook™ review of merchant 121), the second digital content element (e.g., the Instagram™ review merchant 121), and the third digital content element (e.g., the Yelp™ comments on merchant 121) based on corresponding ones of the computed separation distances. For example, the value of contextual weight factor 347 for the Instagram™ review merchant 121 (e.g., associated with the separation distance of zero) may exceed the value of contextual weight factor 347 for the Yelp™ comments on merchant 121 (e.g., associated with the separation distance of unity), which may also exceed the value of contextual weight factor 347 for the Facebook™ review merchant 121 (e.g., associated with the separation distance of three).

In certain instances, and when presented to user 101 through within the aggregated digital content element, the Instagram™ review merchant 121 may be more impactful and relevant to user 101 than either the Yelp™ comments on merchant 121 or the Facebook™ review merchant 121. The disclosed embodiments are, however, not limited to these examples of contextual weight factors or weighting processes, and in other instances, contextual weighting module 346 may compute any additional or alternate values of contextual weight factor 347 that characterize the contextual relationship between the digital content elements, the generating user, and/or the activity of user 101 within one or more digital platforms that publish the generated content elements.

Referring back to FIG. 3C, an impact-based weighting module 350 may establish an impact-based weight factor 351 that reflects, among other things, an expected impact of the digital content on user 101 based on, among other things, a determined sentiment that characterizes the digital content elements or aesthetic characteristics of the digital content element. For example, impact-based weighting module 350 may access data specifying one or more digital content elements (e.g., portions of digital content elements 318A and in some instances, promotional data 306), and apply one or more machine vision or machine learning algorithms to the accessed data to identify one or more approved merchants (e.g., merchant 121), or products or services, referenced or described within each of the digital content elements.

In further examples, impact-based weighting module 350 may apply one or more analytical processes to the accessed data, and to the identified approved merchants, products, or services, to generate data, e.g., sentiment data, characterizing a sentiment expressed by each of the digital content elements towards the approved merchants, products, or services. Impact-based weighting module 350 may also apply one or more image processing techniques, such as those described herein, to identify visual characteristics of the digital content elements deemed aesthetically pleasing to user 101, and to compute data, e.g., aesthetic data, indicative of whether corresponding ones of the digital content element would be aesthetically pleasing to user 101.

For example, an element of digital content that expresses a positive sentiment towards an approved merchant, such as merchant 121, or a product or service offered for sale by merchant 121 (e.g., a positive review of or comments on the yoga studio), may be more impactful on and relevant to user 101 than another element of digital content expressing a negative sentiment towards merchant 121 or towards the products or studios. Based on the generated sentiment data, impact-based weighting module 350 may establish a value of impact-based weight factor 351 for the digital content element associated with the positive sentiment that exceeds a value of impact-based weight factor 351 for the digital content element associated with the negative sentiment.

In other examples, an element of digital content deemed aesthetically pleasing to user 101 may be more impactful or relevant than another element of content deemed less aesthetically pleased or deemed aesthetically displeasing to user 101. Based on the generated aesthetic data, impact-based weighting module 350 may establish a value of impact-based weight factor 351 for the aesthetically pleasing digital content element that exceeds a value of impact-based weight factor 351 for the less aesthetically pleasing or aesthetically displeasing digital content element. The disclosed embodiments are, however, not limited to these examples of content-impact weight factors or weighting processes, and in other instances, impact-based weighting module 350 may perform any additional or alternate processes to compute weight factors indicative of an expected sentimental, aesthetic, or other impact on user 101 that would be appropriate to the digital content elements (e.g., as included within digital content elements 318A and in some instances, promotional data 306).

Referring back to FIG. 3C, an aggregation module 352 of content weighting module 326C may receive the preliminary weight factors generated by each of proximity weighting module 342, preference-based weighting module 344, contextual weighting module 346, and contextual impact-based weighting module 350 for each of the digital content elements (e.g., digital content elements 318A and in some instances, digital content elements included within promotional data 306). As described herein, the preliminary weight factors for each digital content element may include proximity weight factor 343, preference-based weight factor 345, contextual weight factor 347, and impact-based weight factor 351, and aggregation module 352 may compute an aggregated weight factor 354 for each of the digital content elements. Examples of the aggregated weight factors include, but are not limited to, a sum, a linear or geometric combination, an arithmetic mean, or a geometric mean of proximity weight factor 343, preference-based weight factor 345, contextual weight factor 347, and impact-based weight factor 351, and aggregation module 352, and each of aggregated weight factors 354 may characterize and expected relevance and impact of corresponding ones of the digital content elements on user 101, when presented as part of the aggregated digital content element described herein.

Aggregation module 352 may provide aggregated weight factors 354 as an input to a local scheme generation module 356 of content weighting module 326C. In some examples, local scheme generation module 356 may access data identifying the digital content elements (e.g., digital content elements 318A within targeted content data 320, and in some instances, promotional data 306), and may perform operations that dynamically select corresponding ones of the digital content elements in accordance with aggregated weight factors 354, e.g., for inclusion in the aggregated digital content element. Further, and based on aggregated weight factors 354, local scheme generation module 356 may also generate portions of scheme data 328 that identifies not only the selected digital content elements, but also the scheme for dynamically combining and ordering the selected digital content elements within the aggregated digital content element for provisioning to client device 102.

For example, local scheme generation module 356 may rank the digital content elements in accordance with corresponding ones of aggregated weight factors 354 (e.g., from a maximum of aggregated weight factors 354 to a minimum of aggregated weight factors 354). In some instances, local scheme generation module 356 select, for inclusion in the aggregated digital content element, a threshold number of the highest-ranked digital content elements or those digital content elements associated with corresponding ones of the aggregated weight factors 354 that exceed a threshold value. Further, local scheme generation module 356 may establish an ordering of the selected digital content elements that is consistent with aggregated weight factors 354 and reflects the ranking of the digital content elements.

In some examples, local scheme generation module 356 may generate portions of scheme data 328 that include information identifying each of the selected digital content elements (e.g., as maintained within digital content elements 318A of targeted content data 320 or within promotional data 306 of local response data 308), along with additional data specifying the established ordering of the selected digital content elements within the aggregated digital content element. Local scheme generation module 356 may output the generated portions of scheme data 328 to content weighting module 326C, which may pass scheme data 328 back to scheme determination module 326 (not depicted in FIG. 3C).

Referring back to FIG. 3B, scheme determination module 326 may provide scheme data 328 as an input to dynamic combination module 358 of content generation engine 139, which may perform operations that dynamically combine and link together the selected digital content elements in accordance with scheme data 328. For example, dynamic combination module 358 may process scheme data 328 to extract the information identifying the selected digital content elements, and may further identify and extract each of the selected digital content elements from one or more tangible, non-transitory memories, such as from portions of targeted content data 320 (e.g., digital content elements 318A) or from portions of local response data 308 (e.g., digital content elements included within promotional data 306).

Dynamic combination module 358 may, in some instances, perform operations that combine and link together each of the selected digital content elements in accordance with scheme data 328 to establish the aggregated digital content element, e.g., aggregated digital content element 360 of FIG. 3B. Further, and based on portions of scheme data 328, dynamic combination module 358 may also generate formatting data 362 that further specifies and described the ordering of the selected digital content elements within aggregated digital content element 360 (e.g., that certain of the selected digital content elements should be presented together within an interface window), along with additional information specifying dimensions or other visual characteristics of the selected digital content elements, e.g. when rendered for presentation by client device 102.

Dynamic combination module 358 may package aggregated digital content element 360 and formatting data 362 into aggregate content data 364, and content generation engine 139 may provide aggregated content data 364 as an input to a notification generation module 366 of content provisioning system 130. In some examples, notification generation module 366 may package all or a portion of aggregate content data 364 into notification data 368, which may be provided as an input to a routing module 370 of content provisioning system 130. Routing module 370 may identify and obtain a unique network identifier of client device 102, such as an IP or MAC address, from one or more tangible, non-transitory memories, and may perform operations that transmit notification data 368 across network 120 to client device 102, e.g., using any appropriate communications protocol.

A programmatic interface of client device 102, such as API 372, may receive and route notification data 368 to a display module 374 of client device 102. In some examples, API 372 may be associated with or established by the application program executed by client device 102 (e.g., the mobile application program provided by content provisioning system 130), and API 372 may facilitate secure module-to-module communications between routing module 370 of content provisioning system 130 and display module 374 of client device 102.

As illustrated in FIG. 3B, display module 374 may parse notification data 370 and extract portions of aggregated content data 364, e.g., aggregated digital content element 360 and formatting data 362, and provide aggregated content data 364 as an input to an interface element generation module 376 of client device 102. Interface element generation module 376 may process aggregated content data 364, and generate one or more interface elements 378 that reflect and represent portions of aggregated digital content element 360 and formatting data 362. In some aspects, interface element generation module 376 may provide interface elements 378 to display unit 112A, which may render interface elements 378 for presentation to user 101 within a graphical user interface (GUI) 380. For example, and based on interface elements 378, display unit 112 may present aggregated digital content element 360 on GUI 380 in accordance with formatting data 362 without direct intervention from client device 102 or user 101, as described below in reference to FIG. 4.

Figure 4:
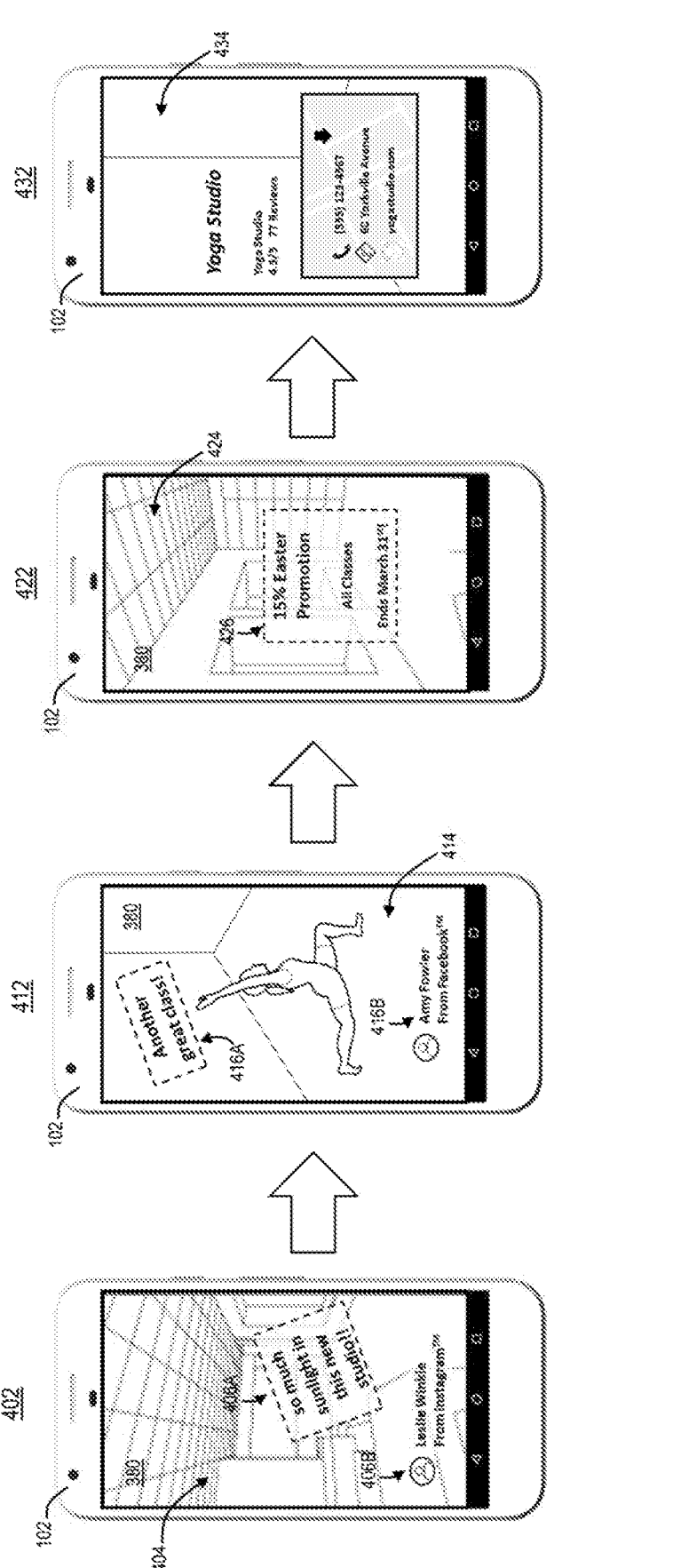
FIG. 4 is a diagram illustrating portions of an exemplary graphical user interface, consistent with the disclosed embodiments.

FIG. 4 is a diagram illustrating a presentation, by client device 102, of exemplary portions of aggregated digital content element 360 within GUI 380, in accordance with certain exemplary embodiments. For example, aggregated digital content element 360 may include a plurality of dynamically selected and ordered digital content elements that describe, reference, or are associated with merchant 121 (e.g., the yoga studio having multiple studio locations in and around Toronto, Canada), and may represent a targeted advertisement for the products or services offered for sale by merchant 121, such as yoga classes offered by the yoga studio.

In some instances, and as described herein, the one or more of the dynamically selected and ordered digital content elements may be generated or published by users of one or more digital platforms, such as a social media platform (e.g., Facebook™, Instagram™, Yelp™, Trip Advisor™, etc.), a microblogging platform (e.g., Twitter™), or a digital platform maintained by a content provider (e.g., Google Maps™). Further, each of these user-generated digital content elements may reference or include one or more of the merchant identifiers associated with the yoga studio (e.g., merchant identifier data 304, described herein), such as the merchant name, one or more social media tags associated with the merchant (e.g., hashtags, handles, etc., identifying the yoga studio), a web address of the yoga studio, or additional geographic location data that specifies each of the studio locations (e.g., a street address or a nearby corner). As described herein, examples of these dynamically selected and ordered digital content elements may include, but are not limited to, digital images or videos of one or more of the locations of the yoga studio, user-generated reviews of the yoga studio, user-generated comments on the yoga studio.

In other examples, the dynamically selected and ordered digital content elements may also include digital content elements associated with promotional campaigns involving merchant 121 (e.g., the yoga studio), such as a specified discount applied to purchase transactions initiated at merchant 121 during a specified temporal interval. Additionally, in some instances, the dynamically selected and ordered digital content elements may include digital content elements that enable user 101 to identify and access merchant 121, such as, but not limited to, the web address of the yoga studio, a telephone number of the yoga studio, or additional geographic location data that specifies each of the studio locations (e.g., a street address or a nearby corner). The disclosed embodiment are, however, not limited to these examples of dynamically selected and ordered digital content elements, and in other instances, aggregated digital content element 360 may include any additional or alternate elements of user-generated digital content, elements of promotional digital content, or other digital content elements that include or reference and of the merchant identifiers described herein.

Referring to FIG. 4, client device 102 may present, within GUI 380, a first portion 402 of aggregated digital content element 360 that includes a digital image 404 related to the yoga studio, and additional digital content elements 406A and 406B, which identify, respectively, a user-generated review of the yoga studio within a corresponding social media platform (e.g., Instagram™) and a user that generated the review (e.g., an Instagram™ handle of the generating user). As illustrated in FIG. 4, client device 102 may be configured to present digital image 404 in a background of first portion 402, such that presented additional digital content elements 406A and 406B overlay and obscure corresponding portions of background digital image 404, e.g., in accordance with combination scheme data characterizing aggregated digital content element 360 (such as scheme data 328 described herein).

In some examples, user 101 may provide input to client device 102 (e.g., by establishing contact between a finger or stylus and a surface of a pressure-sensitive, touchscreen input unit, and slide the finger or stylus in a corresponding direction across the surface, such as left). In response to the provided input, client device 102 may perform any of the exemplary processes described herein to access, render, and present a second portion 412 of aggregated digital content element 360 within GUI 380. For instance, and as illustrated in FIG. 4, second portion 412 may include an additional digital image 414 related to the yoga studio, and additional digital content elements 416A and 416B, which identify, respectively, user-generated comments on the yoga studio within a corresponding social media platform (e.g., Facebook™) and a user that generated the review (e.g., a Facebook™ identifier of the generating user). As described herein, client device 102 may be configured to present digital image 414 in a background of second portion 412, such that presented additional digital content elements 416A and 416B overlay and obscure corresponding portions of background digital image 414, e.g., in accordance with scheme data 328.

Further, and in response to the presentation of second portion 412 within GUI 380, user 101 may provide any of the additional input described herein to client device 102, e.g., via input unit 112B. In response to the provided input, client device 102 may perform any of the exemplary processes described herein to access, render, and present a third portion 422 of aggregated digital content element 360 within GUI 380. For instance, and as illustrated in FIG. 4, third portion 422 may include another digital image 424 related to the yoga studio, and additional digital content element 426 that identifies and specifies a promotional campaign established by the yoga studio (e.g., a 15% seasonal discount on all yoga classes scheduled prior to a particular date, such as March $31^{st}$). As described herein, client device 102 may be configured to present digital image 424 in a background of third portion 422, such that presented additional digital content element 426 overlays and obscures corresponding portions of background digital image 424, e.g., in accordance with scheme data 328.

In additional examples, and responsive to the presentation of third portion 422 within GUI 380, user 101 may provide any of the additional inputs described to client device 102, e.g., via input unit 112B. In response to the provided input, client device 102 may perform any of the exemplary processes described herein to access, render, and present a fourth portion 432 of aggregated digital content element 360 within GUI 380. For instance, and as illustrated in FIG. 4, fourth portion 432 may include yet another digital image 434 related to the yoga studio, and additional digital content elements 436 that enable user 101 to identify and access merchant 121, such as, but not limited to, the web address of the yoga studio, a telephone number of the yoga studio, or additional geographic location data that specifies each of the studio locations (e.g., a street address or a nearby corner).

The disclosed embodiments are, however, not limited to examples of dynamically selected and ordered digital content elements described herein, or to the exemplary portions of these dynamically selected and ordered digital content elements presented within GUI 380. In other instances, consistent with the disclosed embodiments, client device 102 may render and present any additional or alternate portions of aggregated digital content element 360 within GUI 380, each of which may include any additional number or type of the dynamically selected and ordered digital content element. For example, client device 102 may present additional digital content element 414A (e.g., which identifies a user-generated review of the yoga studio) or additional digital content element 416A (e.g., which identifies user-generated comments on the yoga studio) without presenting additional digital content elements identifying a generating user and/or a digital platform.

Figure 5:
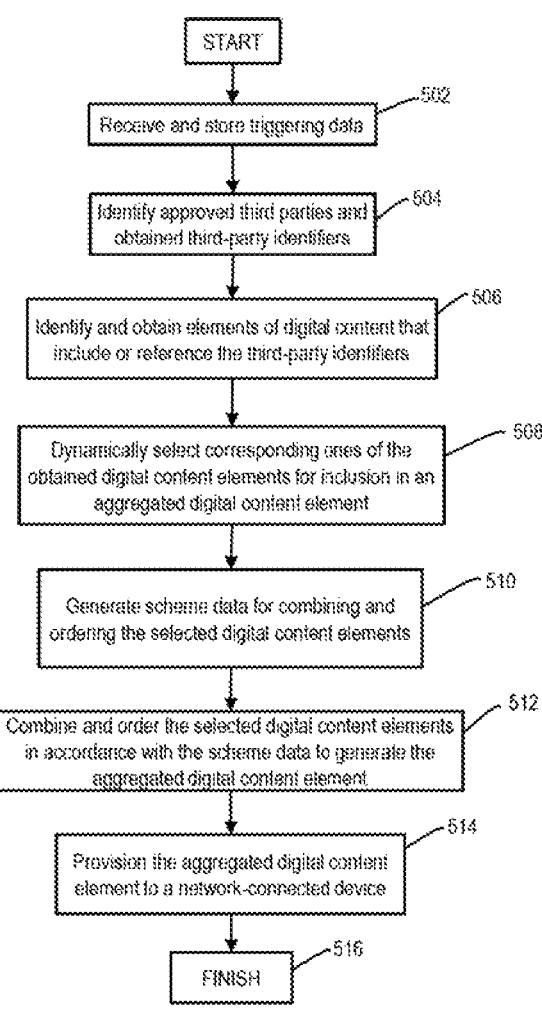
FIG. 5 is a flowchart of exemplary processes for automatically generating and provisioning digital content, in accordance with the disclosed embodiments.

FIG. 5 is a flowchart of an exemplary process 500 for dynamically selecting, generating and provisioning digital content to one or more network-connected devices operating within a computing environment, in accordance with the disclosed embodiments. In some examples, a network-connected computing system, such as content provisioning system 130, may perform the steps of exemplary process 500.

Referring to FIG. 5, content provisioning system 130 may receive data, e.g., triggering data, that triggers a dynamic generation and provisioning of digital content to one or more network-connected devices operating within a computing environment (e.g., in step 502). In some examples, portions of the triggering data may be generated by an application program executed by client device 102 (e.g., a mobile application program provided by content provisioning system 130), and client device 102 may perform any of the exemplary processes described herein to transmit portions of the triggering data across network 120 to content provisioning system 130 at regular intervals or in response to detected occurrences of certain events, e.g., triggering events.

In one example, the triggering data received by content provisioning system 130 may include device data that includes a unique network identifier of client device 102, such as a IP or a MAC address, and additional data that unique identifies the application program executed by client device 102 (e.g., a name of the application, version data, an address of a programmatic interface, such as an API, associated with the executed application program, etc.). Further, and as described herein, the triggering data may also include location data that specifies a current geographic location of client device 102, e.g., as determined by positioning unit 112D. For example, the location data may specify the current geographic location in terms of a longitude, a latitude, and/or an altitude, and may also specify a time or date at which positioning unit 112D captured the current geographic location.

Based on the received triggering data, content provisioning system 130 may perform any of the exemplary processes described herein to identify one or more third parties approved to distribute digital content to the application program executed by client device 102, and to obtain one or more identifiers for each of the approved third parties (e.g., in step 504). For example, content provisioning system 130 may request, and receive, the third-party identifiers from a network-connected computing system, such as third-party targeting system 150, which maintains information associating each of the approved merchants with portions of the triggering data (e.g., the identifier of the executed application program) and portions of the identifying data. As described herein, the approved third parties may include one or merchants approved to distribute digital content, such as digital advertisements, to the executed application program (e.g., "approved" merchants), and for each of the approved merchants, the third-party-identifiers may include merchant identifiers that associate each of the approved merchant with elements of digital content generated or published across one or more digital platforms.

The digital platforms may include, but are not limited to, user- and location-based social media platforms (such as Facebook™, Instagram™, Yelp™ TripAdvisor™), micro-blogging platforms (such as Twitter™), and other digital content providers (such as Google™ or Google Maps™) that publish user-generated digital content relevant to the approved merchants. Further, examples of the merchant identifiers include, but are not limited to, merchant- or product-specific hashtags (e.g., that characterize content within one or more social media or microblogging platforms, such as Facebook™, Instagram™, or Twitter™), merchant names or merchant acronyms, locational identifiers, merchant nicknames, or product names, nicknames, or acronyms.

In some examples, and as described herein, one or more of the approved merchants may also be disposed proximate to the current geographic location of client device 102, e.g., disposed within a threshold distance of the current geographic location or disposed within a geographic region that also includes the current geographic location. Further, one or more of the approved merchants may also be consistent with a content-delivery preference of user 101, such as, but not limited to, a preference to receive digital content related to particular merchants or particular products or services, a preference to receive a particular type of digital content (e.g., video content, etc.), or a preference to receive, or not to receive, digital content derived from a particular source or generate by particular users (e.g., a preference to receive content from Twitter™, etc.).

Additionally, and as described herein, characteristics of user 101 or of client device 102 may be consistent with targeting data established by one or more of the approved merchants, e.g., the one or more approved merchants may elect to target digital content to user 101 or client device 102. Examples of the targeting data for the one or more approved merchants include, but are not limited to, information that specifies one or more targeted geographic regions, information that specifies one or more demographic parameters or targeted customers (e.g. customer age, gender, education level, etc.), or information that identifies one or more targeted customers or corresponding devices (e.g., identifiers of specific customers or corresponding devices involved in prior purchase transactions at the corresponding merchant, etc.).

Referring back to FIG. 5, content provisioning system 130 may perform any of the exemplary processes described herein to identify and obtain elements of digital content that include, reference or describe the third-party identifiers (e.g., in step 506). In some examples, content provisioning system 130 may perform operations that provide all or a portion of the third-party identifiers to a network-connected computing system, e.g., content aggregation system 170, which maintains digital content elements published across any of the digital platforms described herein. Content aggregation system 170 may perform any of the exemplary processes described to identify the digital content elements that include, reference, or describe one or more of the third-party identifiers, and to provide the identified digital content elements, along with additional information, such as metadata, that characterizes each of the identified content elements, across network 120 to content provisioning system 130 through a secure programmatic interface.

As described herein, the third-party identifiers may include merchant identifiers associated with one or more of the approved merchants, and the obtained digital content elements may include one or more elements of digital content (e.g., user-generated elements of digital content) generated by corresponding users of the digital platforms, e.g., based on input provided to corresponding network-connected devices, such as client device 102. Examples of the user-generated elements of digital content may include, but are not limited to, digital images or videos associated with the approved merchants (or of products or services offered for sale by the approved merchants), user-generated reviews of the approved merchants or the products or services, or user-generated comments on the approved merchants or on the products or services. In other examples, the obtained digital content elements may include one or more elements of digital content that collectively establish promotional campaigns associated with one or more of the approved merchants, as described herein.

In some examples, content provisioning system 130 may perform any of the exemplary processes described herein to dynamically select corresponding ones of obtained digital content elements for inclusion within an aggregated element of digital content element for provisioning to client device 102 (e.g., in step 508), and may generate scheme data that identifies and characterizes a scheme for dynamically combining and ordering the selected digital content elements within the single, aggregated digital content (e.g., in step 510). For instance, content provisioning system 130 may select the digital content elements for inclusion within the aggregated digital content element, and/or order the selected digital content elements within the aggregated digital content element, based an application of one or more classification-based combination schemes, hierarchical combination schemes, combination schemes based on content-specific weight factors, or combination schemes based on machine learning algorithms, clustering algorithms, or collaborative filtering algorithms, or combinations thereof, to information, e.g., metadata, identifying the obtained digital content elements. Further, and as described herein, the generated scheme data may identify each of the dynamically selected digital content elements and include additional data that characterizes an ordering, and in some instances, a formatting, of the selected digital content elements when combined into the aggregated digital content element.

Content provisioning system 130 may perform any of the exemplary processes described herein to combine the dynamically selected digital content elements into the single, aggregated digital content element in accordance with the generated scheme data (e.g., in step 512). Further, in step 512, content provisioning system 130 may perform additional operations, such as those described above, to generate formatting data that further specifies and described the ordering of the selected digital content elements within aggregated digital content element (e.g., that certain of the selected digital content elements should be presented together within an interface window), along with additional information specifying dimensions or other visual characteristics of the selected digital content elements, e.g. when rendered for presentation by client device 102. Content provisioning system 130 may package the aggregated digital content element and the generated formatting data into aggregate content data, and in step 514, content provisioning system 130 may transmit the aggregated content data across network 120 to client device 102, e.g., to provision the aggregated digital content element to client device 102.

As described herein, client device 102 may receive the aggregated content data, e.g., through a corresponding programmatic interface, and may perform any of the exemplary processes described herein to present portions of the aggregated digital content element within a graphical user interface (GUI) established by the executed application program (e.g., the mobile application program associated with content provisioning system 130). Exemplary process 500 is then complete in step 516.

c. Exemplary Computer-Implemented Processes for Dynamically Generating and Updating Data-Aggregation Graphical User Interfaces In certain exemplary embodiments, as described herein, content provisioning system 130 may perform operations that, in conjunction with third-party targeting system 150 and content aggregation system 170, identify and obtain elements of user-generated content associated with one or more merchants (e.g., merchant 121) that are approved to distributed digital content, such as digital advertising content, to an application program executed a network-connected device, such as client device 102. The executed application program may, in some instances, correspond to a mobile application program provided by content provisioning system 130. Further, content provisioning system 130 may perform any of the exemplary processes described herein to dynamically select, order, and combine one or more of the obtained elements of digital content to generate an aggregated element of digital content, which content provisioning system 130 may transmit across network 120 to client device 102. As described herein, the application program executed by client device 102 may render the aggregated digital content element for presentation to user 101 through a corresponding interface, such as GUI 380 of FIG. 3.

By dynamically selecting, ordering, and combining obtained elements of digital content into an aggregated digital content element that is relevant to a current geographic location of user 101, content-delivery preferences of user 101, and merchant-specific targeting data established by the approved merchants, certain of the exemplary processes described herein may increase a relevance of the generated and provisioned digital content elements to user 101, and thus reduce a number of digital content elements that, when provisioned to client device 102, achieve a desired impact on the approved merchants or on user 101. The reduction in the number of generated and/or provisioned digital content elements can, in some instances, increase an operational efficiency of content provisioning system 130 and reduce a volume of data exchanged between content provisioning system 130 and other network-connected systems and devices operating within environment 100, thus increasing an amount of available bandwidth and reducing a likelihood of malicious activity, such as man-in-the-middle attacks.

In further examples, described herein, user 101 may participate in one or more loyalty or rewards programs, such as those associated one or more merchants (e.g., merchant 121), or those associated with one or more payment instruments held by user 101 and issued by corresponding financial institutions (e.g., a Visa™ credit card issued by The Toronto-Dominion Bank™). Based on corresponding purchase transactions involving the merchants and/or the payment instruments, one or more of the loyalty or rewards programs may accrue points (e.g., in accordance with program-specific accrual schemes), which user 101 may exchange for certain products or services provided by the merchants or the financial institutions.

The loyalty or rewards programs may, in some instances, be associated with corresponding digital portals, such as a web page accessed using an executed web browser, or a graphical user interface generated by a locally executed mobile application. The digital portals may provide information characterizing a current status of corresponding ones of the loyalty or rewards programs, such as a current amount of accrued points, one or more available rewards, or an additional number of accrued points necessary to obtained a particular reward. To access and obtain the information characterizing the status of one or more of the loyalty or rewards programs, user 101 may access, via client device 102, the corresponding ones of the digital portals, and provide portal-specific authentication credentials as an input to client device 102, e.g., via input unit 112B.

In some examples, the current status of one or more of the loyalty or rewards programs, as accessed through the corresponding digital portals, may inform a decision by user 101 to initiate a purchase transaction at a particular merchant, or a selection of a particular payment instrument to fund the initiated purchase transaction. Conventional processes by which user 101 obtains the information characterizing the current status of the loyalty or rewards programs, which include accessing discrete digital portals associated with each of the loyalty or rewards programs and providing portal-specific authentication credentials, can be cumbersome and difficult for user 101 to implement prior to initiating a purchase transaction, especially using a network-connected devices having limited interface functionalities.

Certain of the exemplary processes described herein, which dynamically generate and update a single interface aggregating portions of the information characterizing the current status of each of the loyalty or rewards programs held by user 101, may be implemented in addition to or as an alternate to any of these conventional processes, which require user 101 to access digital portals associated with the each of the loyalty or rewards programs to obtain the status information. By aggregating the current status information for each the loyalty or rewards programs held by user 101 within a single graphical user interface (GUI), and by dynamically updating the current status information for one or more of the loyalty or rewards programs automatically and without intervention from user 101, certain of the exemplary processes described herein may improve an ability of user 101 to interact with and provide input to the single GUI presented by client device 102, especially when client device 102 is characterized by limited interface functionalities.

In some instance, as described herein, client device 102 may execute one or more application programs, such as a payment application, that establish and maintain a mobile wallet within one or more tangible, non-transitory memories of client device 102. For example, application data 111, e.g., as maintained within data repository 106, may include one or more identifiers of the payment application (e.g., a wallet address assigned to the mobile wallet established and maintained by the executed payment application), and data identifying one or more payment instruments available to the executed payment application (e.g., tokenized data or cryptograms representative of the payment instruments provisioned to the established mobile wallet).

Figure 6A:
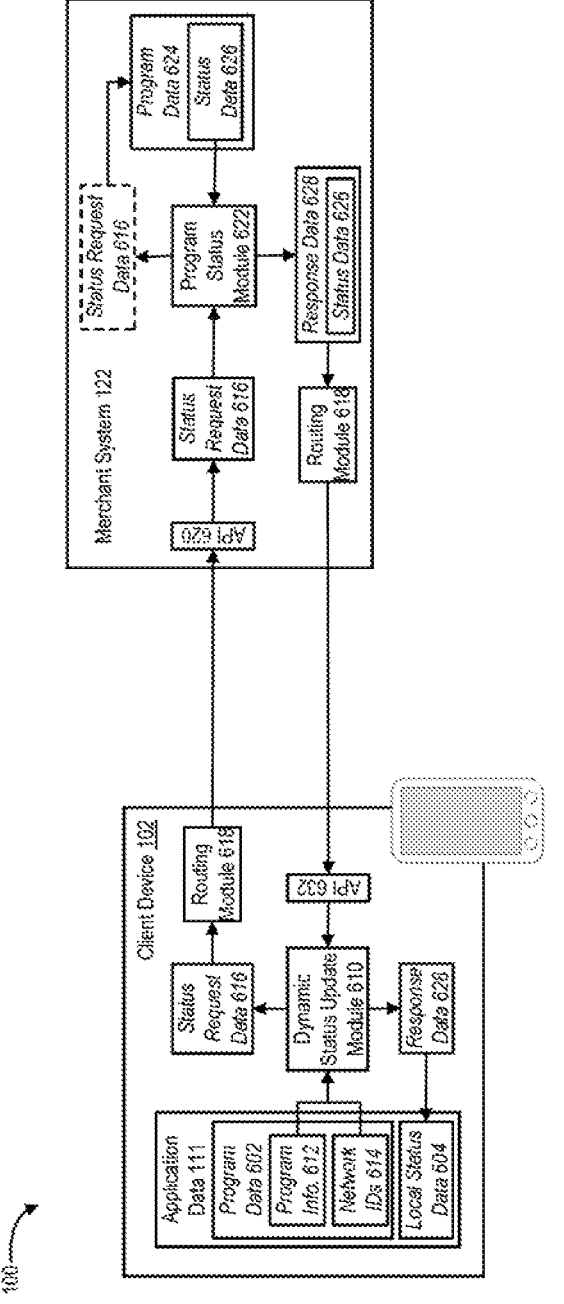
FIGS. 6A and 6B are diagrams illustrating additional portions of an exemplary computing environment, consistent with the disclosed embodiments.

Further, and in reference to FIG. 6A, application data 111 may also include program data 602 identifying one or more loyalty or rewards programs held by user 101 and available for use in purchase transactions, such as those initiated by the executed payment application or initiated by other merchant-specific applications executed by client device 102 (e.g., a mobile application provided by Starbucks™ which facilitates in-application purchases). Program data 602 may include, but is not limited, data identifying account data specifying the loyalty or rewards programs held by user 101 (e.g., account numbers, expiration dates, or other unique identifiers that facilitate an accrual of points based on purchase transactions initiated by the executed payment application), and in some instances, one or more of the loyalty or rewards programs may be associated with, or linked to, corresponding ones of the payment instruments held by user 101 and provisioned to the mobile wallet (e.g., as maintained within application data 111). In further instances, program data 602 may also include a unique network identifier of a computing system configured to administer each of the loyalty or rewards programs, such as an IP or a MAC address.

Application data 111 may also include local status data 604, which characterizes a current status of each of the loyalty or rewards programs held by user 101. By way of example, and for a corresponding one of the loyalty or rewards programs, local status data 604 may include, but is not limited to, information specifying a currently accrued number of loyalty or rewards points, information identifying one or more rewards redeemable by user 101, or information identifying a number of additional accrued points required to obtain a future reward or change in program status. In one instance, portions of local status data 604 may be maintained, modified, or updated by merchant-specific applications executed by client device 102 (e.g., based on purchase transactions initiated through corresponding ones of the executed merchant-specific application). In other instances, as described herein, portions of local status data 604 may be dynamically updated or modified based on additional information obtained from one or more network-connected computing systems associated with corresponding ones of the loyalty or rewards programs, such merchant system 122 maintained by merchant 121 or a computing system maintained by an issuer of a payment instrument held by user 101 (not illustrated in FIG. 6A).

Referring back to FIG. 6A, a dynamic status update module 610 of client device 102 may access program data 602, e.g., as maintained within data repository 106, and identify and obtain information 612 that identifies one or more of the loyalty or rewards programs held by user 101 and the unique network identifiers 614 of the network-connected computing systems that administer corresponding ones of the identified loyalty or rewards programs. For example, user 101 may participate in a loyalty program maintained by Starbucks™, and dynamic status update module 610 may identify and obtain, from program data 602, information 612 that uniquely identifies the Starbucks™ loyalty program held by user 101 (e.g., an account number of the loyalty program) and network identifier 614 for the corresponding network-connected computing system that administers the Starbucks™ loyalty program, e.g., an IP or MAC address of merchant system 122.

In some examples, dynamic status update module 610 may perform operations that package all or a portion of information 612 into status request data 616, along with additional data that uniquely identifies client device 102, such as an IP or a MAC address extracted from device data 108 of data repository 106. Dynamic status update module 610 may provide network identifier 614 and status request data 616 as inputs to a routing module 618 of client device 102, which may perform operations that transmit status request data 616 across network 120 to merchant system 122, e.g., to network identifier 614 of merchant system 122 using any appropriate communications protocol.

A programmatic interface of merchant system 122, such as API 620, may receive status request data 616. By way of example, API 620 may be associated with, and established and maintained by a program status module 622 of merchant system 122, and may facilitate direct, module-to-module communications between routing module 618 of client device 102 and program status module 622. As illustrated in FIG. 6A, API 620 may route status request data 616 to program status module 622, which may perform any of the exemplary processes described herein to determine a current status of loyalty or rewards program specified within status request data 616, e.g., the Starbucks™ loyalty program held by user 101.

For example, program status module 622 may store status request data 616 within one or more tangible, non-transitory memories, and may parse status request data 616 to extract loyalty-program information 612, which includes an account number or other information that uniquely identifies the Starbucks™ loyalty program held by user 101. Program status module 622 may access locally stored program data 624 that characterizes the Starbucks™ loyalty programs held by user 101 and other customers, e.g., as maintained within one or more tangible, non-transitory memories, and identify and extract customer-specific status data 626 that specifies the current status of the Starbucks™ loyalty programs held by user 101. As described herein, status data 626 may include, but is not limited to, information specifying a currently accrued number of loyalty points accrued by user 101, information identifying one or more available Starbucks™ rewards redeemable by user 101, or information identifying a number of additional accrued points required to obtain a future reward or change in program status.

For example, as part of user 101's Starbucks™ loyalty program, purchases of $500 from participating Starbucks™ retailers would classify user 101 as a "gold" member of the Starbucks™ loyalty program. Status data 626 may, in some instances, indicate that user 101 has completed seventy-nine percent of the required purchases (e.g., $500) that would update user 101's membership status. The disclosed embodiments are, however, not limited to these examples of program status data, in other instances, status data 626 may include any additional or alternate data capable of characterizing the current status of user 101's Starbucks™ loyalty program, including the exemplary status data described herein.

Program status module 622 may package all or a portion of status data 626 into response data 628, which program status module 622 may provide as an input to a routing module 630 of merchant system 122. In some examples, routing module 630 may obtain a unique network identifier of client device 102, e.g., as maintained within the one or more tangible, non-transitory memories (e.g., as a portion of request data 616), and perform operations that transmit response data 628 across network 120 to client device 102, e.g., using any appropriate communications protocol.

A programmatic interface of client device 102, e.g., API 632, may receive and route response data 628 back to dynamic status update module 610. By way of example, API 632 may be established and maintained by dynamic status update module 610, and may facilitate direct and secure, module-to-module communication between routing module 630 of merchant system 122 and dynamic status update module 610. Dynamic status update module 610 may receive response data 628, and may perform operations that store portions of response data 628 within local status data 604, which update the status of user 101's Starbucks™ loyalty program dynamically and without input from user 101 or client device 102.

In some examples, described herein, client device 102 and merchant system 122 perform operations that collectively update a status of user 101's Starbucks™ loyalty program (e.g., as maintained by merchant system 122) dynamically and without intervention from user 101 or client device 102. In additional examples, not illustrated in FIG. 6A, client device 102 may perform any of the exemplary processes described herein, either alone or in conjunction with other network-connected computing systems (e.g., those operated by merchants, issuers of payment instruments, financial institutions, etc.), to update the current status of additional or alternate loyalty or rewards programs held by user 101, such as, but not limited to, a loyalty program established and maintained by McDonald's™ restaurants, a loyalty program the Liquor Control Board of Ontario (LCBO™), or a rewards program associated with a Visa™ credit card issued by The Toronto-Dominion Bank™.

Figure 6B:
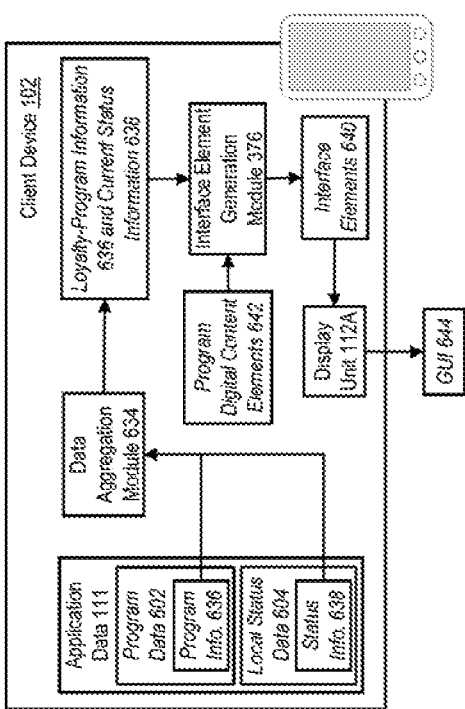
Figure 6B:

In further embodiments, described in reference to FIG. 6B, client device 102 may dynamically generate and update a single graphical user interface (e.g., a GUI) that aggregates digital content characterizing the current status of each of the loyalty or rewards programs held by user 101 (e.g., the Starbucks™ loyalty program, the McDonald's™ loyalty program, the LCBO™ loyalty program, and the rewards program associated with a Visa™ credit card). Referring to FIG. 6B, a data aggregation module 634 of client device 102 may access program data 602, e.g., as maintained within data repository 106, and extract loyalty-program information 636 that identifies each of the one or more of the loyalty or rewards programs held by user 101.

Data aggregation module 634 may also access local status data 604, as further maintained within data repository 106, and based on portions of loyalty-program data 636, extract status information 638 that characterizes a current status of each of the identified loyalty or rewards programs held by user 101. As described herein, status information 638 may include, for each of the loyalty or rewards programs held by user 101, include information specifying a currently accrued number of loyalty points accrued by user 101, information identifying one or more rewards redeemable by user 101, or information identifying a number of additional accrued points required to obtain a future reward or change in program status.

Data aggregation module 634 may, in some instances, provide loyalty-program information 636 and status information 638 as inputs to interface element generation module 376, which may process loyalty-program information 636 and status information 638 and, and generate interface elements 640 that reflect and represent a current status of each of the loyalty or rewards programs held by user 101. In instances, interface element generation module 376 may further access the one or more tangible memories, and extract one or more elements of digital content associated with the loyalty or rewards programs held by user 101, e.g., program digital content elements 642.

For example, program digital content elements 642 may include one or more digital images associated with one or more of the loyalty or rewards programs, such as corporate or program specific logos, etc., and interface element generation module 376 may incorporate portions of program digital content elements 642 into corresponding ones of the interface elements 640 that reflect and represent the current status of the loyalty or rewards programs. In other examples, program digital content elements 642 may include one or more interface-element templates associated with corresponding ones of the loyalty or rewards programs held by user 101. Interface element generation module 376 may populate the interface-element templates with corresponding portions of loyalty-program information 636 or status information 638, and generate corresponding ones of interface elements 640 that represent the populated interface-element templates.

In some aspects, interface element generation module 376 may provide interface elements 640 to display unit 112A, which may render interface elements 640 for presentation to user 101 within a single graphical user interface (GUI) 644. For example, and based on interface elements 640, display unit 112 may present, within single GUI 644, digital content representing the current status of each of the loyalty or rewards programs held by user 101 without intervention from user 101 or client device 102, as described below in reference to FIG. 7. Further, although not illustrated in FIG. 6A or 6B, client device 102 may perform any of the exemplary processes described herein to dynamically update not only the current status of one or more of the loyalty or rewards programs, but also refresh the presented digital content to reflect these updated loyalty- or rewards-program statuses.

Figure 7:
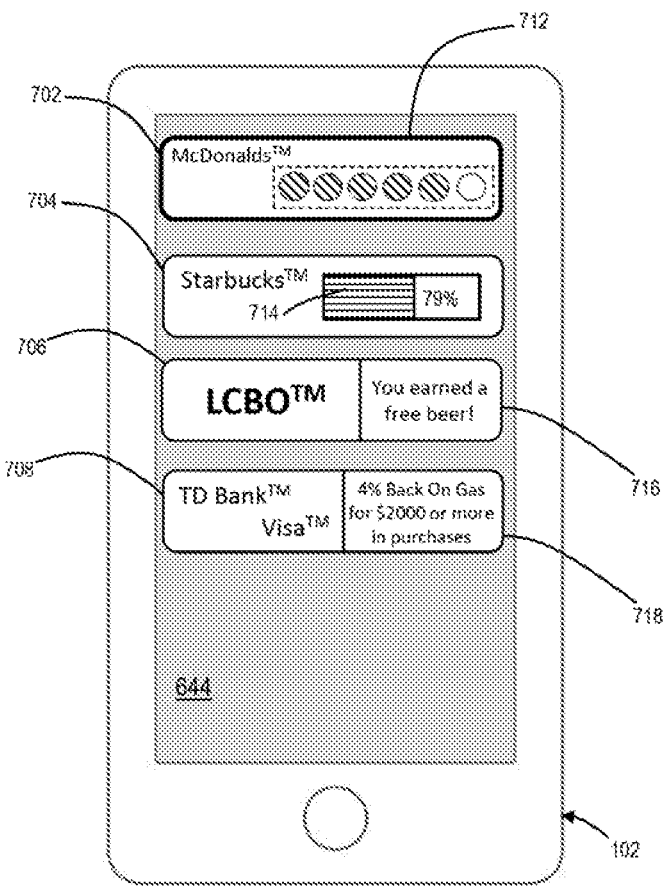
FIG. 7 is a diagram illustrating portions of an exemplary graphical user interface, consistent with the disclosed embodiments.

FIG. 7 is a diagram illustrating a presentation, by client device 102, of exemplary digital content representing a current status of each loyalty or rewards programs held by user 101 within a single interface, in accordance with certain exemplary embodiments. For example, and as described herein, user 101 may hold or participate in loyalty or rewards programs that include, among other things, a Starbucks™ loyalty program, a loyalty program established and maintained by McDonald's™ restaurants, a loyalty program the Liquor Control Board of Ontario (LCBO™), or a rewards program associated with a Visa™ credit card issued by The Toronto-Dominion Bank™.

In some instances, as illustrated in FIG. 7, client device 102 may present, on single GUI 644, interface elements 702 that reflect the current status of the McDonald's™ loyalty program, interface elements 704 that reflect the current status of the Starbucks™ loyalty program, interface elements 706 reflect the current status the LCBO™ loyalty program, and interface elements 708 reflect the current status of the rewards program associated with a Visa™ credit card issued by The Toronto-Dominion Bank™. By way of example, interface elements 702 may include one or more digital images associated with McDonald's™ restaurants, and further, additional digital content 712 that visually indicate to user 101 the current status of the McDonald's™ loyalty program. For example, digital content 712 may indicate that user 101 initiated five qualifying purchases from McDonald's™ restaurants and, upon initiation of a sixth purchase, user 101 will be provided with a reward redeemable during future purchases at McDonald's™ restaurants (e.g., a free sandwich, a predetermined discount, etc.).

Further, interface elements 704 may include one or more digital images associated with Starbucks™, and further, additional digital content 714 that visually indicate to user 101 the current status of the Starbucks™ loyalty program. For example, digital content 714 may include a fillable bar indicator specifying that user 101 has completed seventy-nine percent of the required purchases (e.g., $500) that would update user 101's membership status to "gold." Interface elements 706 may include one or more digital images associated with LBCO™ (e.g., a logo of LBCO™), and further, additional digital content 716 that identifies a currently available reward, e.g., a free beer from LBCO™.

In additional instances, interface elements 708 may include one or more digital images associated with the rewards program linked to the Visa™ credit card issued by The Toronto-Dominion Bank™ (e.g., a logo or other digital content associated with Visa™ and/or The Toronto-Dominion Bank™), and further, additional digital content 718 that identifies an amount of remaining purchases (e.g., $2,000) necessary to redeem a reward (e.g., 4% cash-back reward on fuel purchases). The disclosed embodiments are, however, not limited to these examples of interface element or digital content, and in other examples, GUI 644 may present any additional or alternate interface elements, including any additional or alternate digital content, that represents the current status of the loyalty or rewards program held by user 101.

III. Exemplary Hardware and Software Implementations

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification, including content generation engine 139, initiation module 202, API 210, third-party targeting module 212, API 218, query module 220, API 300, content retrieval module 310, routing module 314, API 315, content identification module 316, routing module 322, scheme determination module 326, machine learning module 326A, classification and hierarchical module 326B, content weighting module 326C, proximity weight module 342, preference-based weighting module 344, contextual weighting module 346, impact-based weighting module 350, aggregation module 352, local scheme generation module 356, dynamic combination module 358, notification generation module 366, routing module 370, display module 3274, interface element generation module 376, dynamic status update module 610, routing module 618, API 620, program status module 622, routing module 618, API 632, or data aggregation module 634, can be implemented as one or more computer programs, i.e., one or more modules of computer program instructions encoded on a tangible non transitory program carrier for execution by, or to control the operation of, a data processing apparatus (or a computer system).

Additionally, or alternatively, the program instructions can be encoded on an artificially generated propagated signal, such as a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The terms "apparatus," "device," and "system" refer to data processing hardware and encompass all kinds of apparatus, devices, and machines for processing data, including by way of example a programmable processor, a computer, or multiple processors or computers. The apparatus, device, or system can also be or further include special purpose logic circuitry, such as an FPGA (field programmable gate array) or an ASIC (application-specific integrated circuit). The apparatus, device, or system can optionally include, in addition to hardware, code that creates an execution environment for computer programs, such as code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, such as one or more scripts stored in a markup language document, in a single file dedicated to the program in question, or in multiple coordinated files, such as files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, such as an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, such as magnetic, magneto-optical disks, or optical disks. However, a computer need not have such devices. Moreover, a computer can be embedded in another device, such as a mobile telephone, a personal digital assistant (PDA), a mobile audio or video player, a game console, a Global Positioning System (GPS) receiver, or a portable storage device, such as a universal serial bus (USB) flash drive, to name just a few.

Computer-readable media suitable for storing computer program instructions and data include all forms of non-volatile memory, media and memory devices, including by way of example semiconductor memory devices, such as EPROM, EEPROM, and flash memory devices; magnetic disks, such as internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display unit, such as a CRT (cathode ray tube) or LCD (liquid crystal display) monitor, for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Implementations of the subject matter described in this specification can be implemented in a computing system that includes a back-end component, such as a data server, or that includes a middleware component, such as an application server, or that includes a front-end component, such as a computer having a graphical user interface or a Web browser through which a user can interact with an implementation of the subject matter described in this specification, or any combination of one or more such back-end, middleware, or front-end components. The components of the system can be interconnected by any form or medium of digital data communication, such as a communication network. Examples of communication networks include a local area network (LAN) and a wide area network (WAN), such as the Internet.

The computing system can include clients and servers. A client and server are generally remote from each other and typically interact through a communication network. The relationship of client and server arises by virtue of computer programs running on the respective computers and having a client-server relationship to each other. In some implementations, a server transmits data, such as an HTML page, to a user device, such as for purposes of displaying data to and receiving user input from a user interacting with the user device, which acts as a client. Data generated at the user device, such as a result of the user interaction, can be received from the user device at the server.

While this specification includes many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Various embodiments have been described herein with reference to the accompanying drawings. It will, however, be evident that various modifications and changes may be made thereto, and additional embodiments may be implemented, without departing from the broader scope of the disclosed embodiments as set forth in the claims that follow.

Further, other embodiments will be apparent to those skilled in the art from consideration of the specification and practice of one or more embodiments of the present disclosure. It is intended, therefore, that this disclosure and the examples herein be considered as exemplary only, with a true scope and spirit of the disclosed embodiments being indicated by the following listing of exemplary claims.

What is claimed is:

1. An apparatus, comprising:
a communications unit;
a storage unit storing instructions; and
at least one processor coupled to the communications unit and the storage unit, the at least one processor executing the instructions to:

receive, via the communications unit, an application identifier of an application program executed at a device;

based on the application identifier, obtain an identifier of a third party associated with the executed application program, and obtain first elements of digital content that include a representation of the identifier of the third party;

determine at least one characteristic of the first elements of digital content, and based on an application of a trained machine learning process or a trained artificial intelligence process to an input dataset that includes the at least one characteristic of the first elements of digital content, perform operations that determine dynamically a combination scheme consistent with the at least one characteristic of the first elements of digital content, the combination scheme specifying an ordering of and a format of each of the subset of the first elements of digital content within a second element of digital content; and based on data characterizing the combination scheme, generate the second element of digital content that includes a subset of the first elements of digital content and transmit the second element of digital content to the device via the communications unit, the device being configured by the executed application program to display the second element of digital content within a digital interface.

2. The apparatus of claim 1, wherein the at least one processor is further configured to execute the instructions to receive information generated by the executed application program via the communications unit, the information comprising the application identifier.

3. The apparatus of claim 2, wherein:

the information further comprises location data identifying a first geographic location of the device; and the at least one processor is further configured to execute the instructions to obtain the identifier of the third party based on the application identifier and a portion of the location data, the third party being associated with a second geographic location disposed proximate to the first geographic location.

4. The apparatus of claim 1, wherein the at least one processor is further configured to execute the instructions to:

obtain scheme data associated with the combination scheme, the scheme data specifying the at least one of the ordering of or the formatting of each of the subset of the first elements of digital content within the second element of digital content; and generate the second element of digital content based on the scheme data and the subset of the first elements of digital content.

5. The apparatus of claim 4, wherein:

the scheme data identifies a target visual characteristic of at least one of the first elements of digital content;

the at least one processor is further configured to execute the instructions to modify a visual characteristic at least one of the first elements of digital content in accordance with the target visual characteristic; and the second element of digital content that includes the at least one of the modified first elements of digital content, the at least one of the modified first elements of digital content being ordered within the second element of digital content in accordance with the scheme data.

6. The apparatus of claim 4, wherein the at least one processor further executes the instructions to:

compute a weight factor reflecting a relevance of each of the first elements of digital content to the third party;

select the subset of the first elements of digital content based on the computed weight factors; and generate the second element of digital content, and incorporate the subset of the first elements of digital content into the second element of digital content, in accordance with the computed weight factors and the scheme data.

7. The apparatus of claim 1, wherein the at least one processor is further configured to execute the instructions to transmit the second element of digital content to the device through a programmatic interface associated with the executed application program.

8. The apparatus of claim 1, wherein:

the at least one processor is further configured to execute the instructions to obtain the identifier of the third party based on the application identifier and preference data associated with the device; and a value of a parameter that characterizes the third party is consistent with the preference data.

9. The apparatus of claim 1, wherein:

the first elements of digital content comprise at least one of a digital image or a digital video;

the at least one of the digital image or the digital video comprises a visual representation of the identifier of the third party; and the at least one processor is further configured to execute the instructions to obtain the at least one or the digital image or the digital video based on an application of image processing to a corresponding portion of the digital image or the digital video.

10. The apparatus of claim 1, wherein the at least one processor is further configured to execute the instructions to aggregate the subset of the first digital content elements within the second elements of digital content in accordance with the at least one of the specified ordering or the specified format.

11. A computer-implemented method, comprising:

receiving, using at least one processor, an application identifier of an application program executed at a device;

based on the application identifier, obtaining, using the at least one processor, an identifier of a third party associated with the executed application program, and obtaining, using the at least one processor, first elements of digital content that include a representation of the identifier of the third party;

determining, using the at least one processor, at least one characteristic of the first elements of digital content, and based on an application of a trained machine learning process or a trained artificial intelligence process to an input dataset that includes the at least one characteristic of the first elements of digital content, determining dynamically, using the at least one processor, a combination scheme consistent with the at least one characteristic of the first elements of digital content, the combination scheme specifying an ordering of and a format of each of the subset of the first elements of digital content within a second element of digital content; and based on data characterizing the combination scheme, and using the at least one processor, generating the second element of digital content that includes a subset of the first elements of digital content and transmitting the second element of digital content to the device using the at least one processor, the device being configured by the executed application program to display the second element of digital content within a digital interface.

12. The computer-implemented method of claim 11, wherein the receiving comprises receiving information generated by the executed application program, the information comprising the application identifier.

13. The computer-implemented method of claim 12, wherein:
the information further comprises location data identifying a first geographic location of the device; and
obtaining the identifier of the third party comprises obtaining the identifier of the third party based on the application identifier and a portion of the location data, the third party being associated with a second geographic location disposed proximate to the first geographic location.

14. The computer-implemented method of claim 11, wherein:
the computer-implemented method further comprises obtaining, using the at least one processor, scheme data associated with the combination scheme, the scheme data specifying the at least one of the ordering of or the formatting of each of the subset of the first elements of digital content within the second element of digital content; and
the generating comprises generating, using the at least one processor, the second element of digital content based on the scheme data and the subset of the first elements of digital content.

15. The computer-implemented method of claim 14, wherein:
the scheme data identifies a target visual characteristic of at least one of the first elements of digital content;
the computer-implemented method further comprises modifying, using the at least one processor, a visual characteristic at least one of the first elements of digital content in accordance with the target visual characteristic; and
the second element of digital content that includes the at least one of the modified first elements of digital content, the at least one of the modified first elements of digital content being ordered within the second element of digital content in accordance with the scheme data.

16. The computer-implemented method of claim 14, further comprising:
computing, using the at least one processor, a weight factor reflecting a relevance of each of the first elements of digital content to the third party;
selecting, using the at least one processor, the subset of the first elements of digital content based on the computed weight factors; and using the at least one processor, generating the second element of digital content, and incorporating the subset of the first elements of digital content into the second element of digital content, in accordance with the computed weight factors and the scheme data.

17. The computer-implemented method of claim 11, wherein:
obtaining the identifier of the third party comprises obtaining the identifier of the third party based on the application identifier and on preference data associated with the device; and
a value of a parameter that characterizes the third party is consistent with the preference data.

18. The computer-implemented method of claim 11, wherein:
the first elements of digital content comprise at least one of a digital image or a digital video;
the at least one of the digital image or the digital video comprises a visual representation of the identifier of the third party; and
the computer-implemented method further comprises obtaining, using the at least one processor, the at least one or the digital image or the digital video based on an application of image processing to a corresponding portion of the digital image or the digital video.

19. A tangible, non-transitory computer-readable medium storing instructions that, when executed by at least one processor, perform a method comprising:
receiving an application identifier of an application program executed at a device;
based on the application identifier, obtaining an identifier of a third party associated with the executed application program, and obtaining, using the at least one processor, first elements of digital content that include a representation of the identifier of the third party;
determining at least one characteristic of the first elements of digital content, and based on an application of a trained machine learning process or a trained artificial intelligence process to an input dataset that includes the at least one characteristic of the first elements of digital content, determining dynamically a combination scheme consistent with the at least one characteristic of the first elements of digital content, the combination scheme specifying an ordering of and a format of each of the subset of the first elements of digital content within a second element of digital content; and
based on data characterizing the combination scheme, generating the second element of digital content that includes a subset of the first elements of digital content and transmitting the second element of digital content to the device, the device being configured by the executed application program to display the second element of digital content within a digital interface.

* * * * *